US012647885B2

(12) United States Patent
Watanabe

(10) Patent No.: US 12,647,885 B2
(45) Date of Patent: Jun. 2, 2026

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Ryo Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 17/700,090

(22) Filed: Mar. 21, 2022

(65) Prior Publication Data

US 2022/0312314 A1 Sep. 29, 2022

(30) Foreign Application Priority Data

Mar. 26, 2021 (JP) ................................. 2021-053214
Dec. 23, 2021 (JP) ................................. 2021-209577

(51) Int. Cl.
*H04W 52/02* (2009.01)
*H04W 4/06* (2009.01)
*H04W 72/30* (2023.01)

(52) U.S. Cl.
CPC ......... *H04W 52/0212* (2013.01); *H04W 4/06* (2013.01); *H04W 72/30* (2023.01)

(58) Field of Classification Search
None
See application file for complete search history.

(56) References Cited

U.S. PATENT DOCUMENTS

| | | | | |
|---|---|---|---|---|
| 2004/0122888 | A1* | 6/2004 | Carmichael | ......... H04L 12/2801 709/200 |
| 2020/0163141 | A1 | 5/2020 | Hsu | |
| 2020/0322854 | A1* | 10/2020 | Ryoo | ............... H04W 36/0085 |
| 2020/0351988 | A1* | 11/2020 | Chen | ..................... H04W 88/10 |
| 2020/0396568 | A1* | 12/2020 | Huang | ................... H04W 76/40 |
| 2021/0058868 | A1 | 2/2021 | Cariou | |
| 2021/0259033 | A1* | 8/2021 | Kim | ..................... H04W 76/11 |
| 2021/0315036 | A1* | 10/2021 | Jang | ..................... H04W 76/15 |
| 2022/0182184 | A1* | 6/2022 | Wang | ................... H04L 1/1893 |

FOREIGN PATENT DOCUMENTS

| | | |
|---|---|---|
| CN | 106664727 A | 5/2017 |
| CN | 112492682 A | 3/2021 |
| CN | 112512135 A | 3/2021 |

(Continued)

OTHER PUBLICATIONS

Ming Gan et al., Group addressed frames delivery for MLO, doc.:IEEE 802.11-20/0661-03-00be, Apr. 20, 2020.

*Primary Examiner* — Andre Tacdiran
(74) *Attorney, Agent, or Firm* — Canon U.S.A., Inc. IP Division

(57) ABSTRACT

When a communication apparatus transmits a frame by multicast communication or broadcast communication in a state in which connection with one or more other communication apparatuses has been established via a plurality of frequency channels, the communication apparatus determine a frequency channel for use in transmitting the frame based on whether the one or more other communication apparatuses is being operated in a power-saving state in the plurality of frequency channels, and transmits the frame via the determined frequency channel.

9 Claims, 14 Drawing Sheets

(56) References Cited

FOREIGN PATENT DOCUMENTS

| EP | 3934309    | *  | 7/2020  |
| EP | 3739837    | *  | 11/2020 |
| JP | 2018050133 | A  | 3/2018  |
| WO | 2020032633 | A1 | 2/2020  |
| WO | 2020203190 | A1 | 10/2020 |
| WO | 2020226462 | A1 | 11/2020 |
| WO | 2020243117 | A1 | 12/2020 |

* cited by examiner

FIG.8

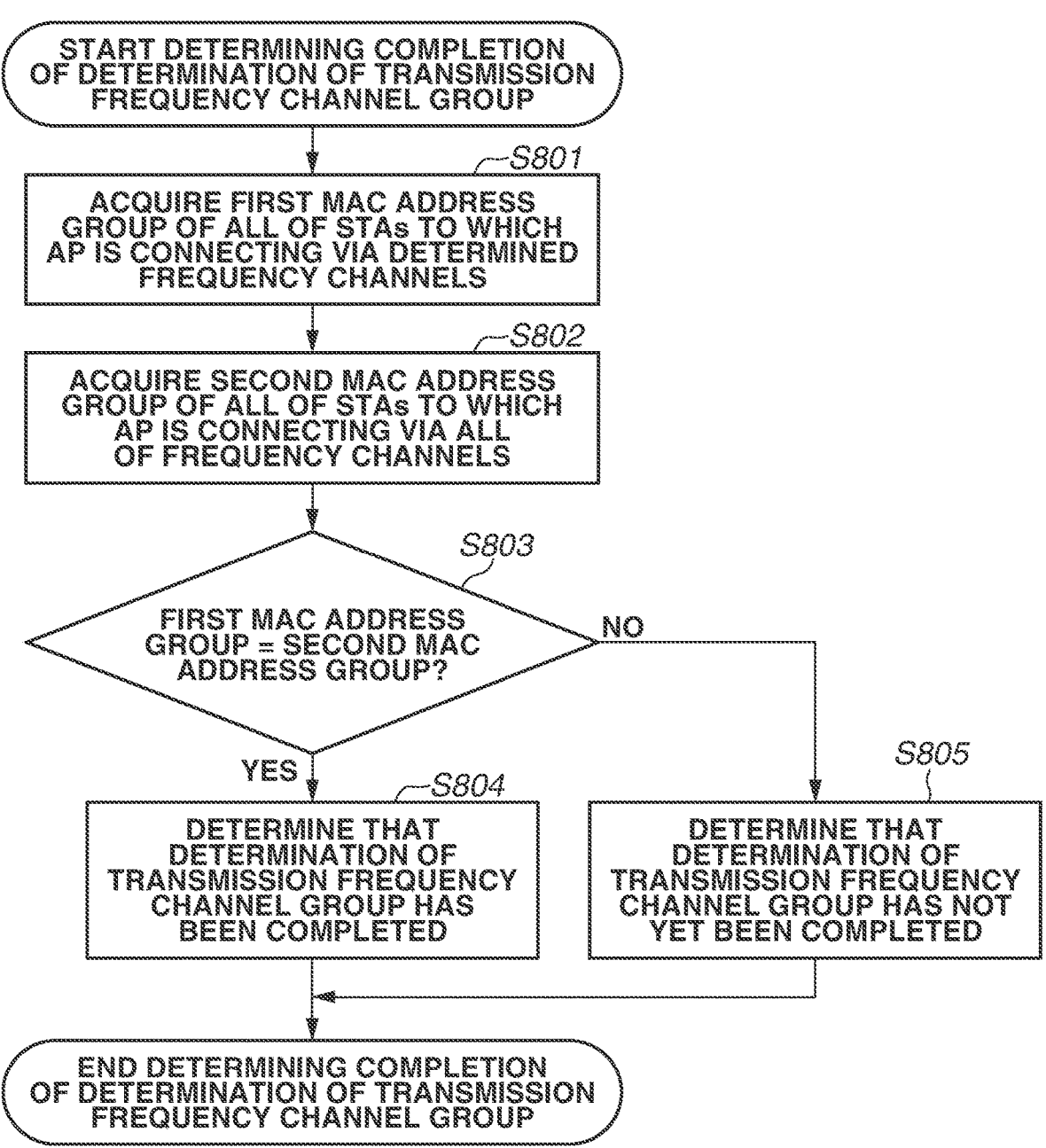

START DETERMINING COMPLETION OF DETERMINATION OF TRANSMISSION FREQUENCY CHANNEL GROUP

S801
ACQUIRE FIRST MAC ADDRESS GROUP OF ALL OF STAs TO WHICH AP IS CONNECTING VIA DETERMINED FREQUENCY CHANNELS

S802
ACQUIRE SECOND MAC ADDRESS GROUP OF ALL OF STAs TO WHICH AP IS CONNECTING VIA ALL OF FREQUENCY CHANNELS

S803
FIRST MAC ADDRESS GROUP = SECOND MAC ADDRESS GROUP?

NO

YES

S804
DETERMINE THAT DETERMINATION OF TRANSMISSION FREQUENCY CHANNEL GROUP HAS BEEN COMPLETED

S805
DETERMINE THAT DETERMINATION OF TRANSMISSION FREQUENCY CHANNEL GROUP HAS NOT YET BEEN COMPLETED

END DETERMINING COMPLETION OF DETERMINATION OF TRANSMISSION FREQUENCY CHANNEL GROUP

COMMUNICATION APPARATUS, COMMUNICATION METHOD, AND STORAGE MEDIUM

BACKGROUND

Field

Aspects of the present disclosure generally relate to a communication apparatus which performs wireless communication.

Description of the Related Art

As a WLAN communication standard formulated by the Institute of Electrical and Electronics Engineers (IEEE), there is known an IEEE 802.11 standard series. WLAN is an abbreviation for wireless local area network. The IEEE 802.11 standard series includes, for example, IEEE 802.11a, 802.11b, 802.11g, 802.11n, 802.11ac, and 802.11ax standards.

In IEEE 802.11ax, as discussed in Japanese Patent Application Laid-Open No. 2018-50133, OFDMA is used to implement, in addition to a high peak throughput of up to 9.6 gigabits per second (Gbps), an increase in communication speed under a congestion situation. OFDMA is an abbreviation for orthogonal frequency-division multiple access.

To achieve a further increase in throughput, a task group for performing formulation of the standard IEEE 802.11be as a successor standard to IEEE 802.11ax was established.

In the IEEE 802.11be standard, a technique in which one access point (AP) establishes a plurality of links with one station (STA) via a plurality of different frequency channels is under consideration.

In this way, in the IEEE 802.11be standard, a multi-link communication in which an AP and an STA establish connection via a plurality of frequency channels and perform communications in parallel is being considered.

In a case where an AP and an STA have established connection via a first frequency channel and a second frequency channel, the STA may be in a state of being able to perform communication via the first frequency channel but in a state of being unable to perform communication via the second frequency channel.

At that time, when the AP transmits a frame to the STA by multicast or broadcast communication, the frame is also transmitted via the second frequency channel.

Here, for example, since the frame is transmitted even via the second frequency channel, in which the STA is operating in the power-saving state, the STA may have to wastefully enter into a state of being able to perform communication via the second frequency channel.

Moreover, in a case where an AP and an STA have established connection via a first frequency channel and a second frequency channel, for example, a communication situation in the second frequency channel may be bad. If, at this time, a frame is also transmitted via the second frequency channel, a packet loss may occur, so that the frame may have to be re-transmitted even via the first frequency channel.

Moreover, in a case where an AP and an STA have established connection via a first frequency channel, a second frequency channel, and a third frequency channel, for example, the first frequency channel and the second frequency channel may be close to each other. If, at this time, a frame is also transmitted via the second frequency channel, such a transmission may exert an influence on transmission and reception of the frame in the first and second hi frequency channels, so that a wasteful period in which the frame is not able to be transmitted and received via the first frequency channel may occur.

In this way, at the time of multi-link communication, if a frame is transmitted by multicast communication or broadcast communication via all of the frequency channels, an issue such as that described above may arise.

SUMMARY

Various embodiments of the present disclosure provide mechanisms and techniques for, when a communication apparatus and another communication apparatus have established connection via a plurality of frequency channels, preventing or reducing transmission of a frame via all of the frequency channels in which connection has been established.

According to various embodiments of the present disclosure, a communication apparatus is provided that includes an establishment unit configured to establish connection with one or more other communication apparatuses via a plurality of frequency channels, a determination unit configured to, when the communication apparatus transmits a frame by multicast communication or broadcast communication in a state in which connection with the one or more other communication apparatuses has been established by the establishment unit via the plurality of frequency channels, determine a frequency channel for use in transmitting the frame based on whether the one or more other communication apparatuses is being operated in a power-saving state in the plurality of frequency channels, and a transmission unit configured to transmit the frame via the frequency channel determined by the determination unit.

According to other embodiments of the present disclosure, a communication apparatus includes an establishment unit configured to establish connection with one or more other communication apparatuses via a plurality of frequency channels, a determination unit configured to, when the communication apparatus transmits a frame by multicast communication or broadcast communication in a state in which connection with the one or more other communication apparatuses has been established by the establishment unit via the plurality of frequency channels, determine a frequency channel for use in transmitting the frame based on a communication situation of the plurality of frequency channels, and a transmission unit configured to transmit the frame via the frequency channel determined by the determination unit.

According to yet other embodiments of the present disclosure, a communication apparatus includes an establishment unit configured to establish connection with another communication apparatus via a first frequency channel, a second frequency channel, and a third frequency channel, and a transmission unit configured to, when the communication apparatus transmits a frame by multicast communication or broadcast communication in a state in which connection with the other communication apparatus has been established by the establishment unit via the first frequency channel, the second frequency channel, and the third frequency channel, transmit the frame via the first frequency channel or the second frequency channel in a case where transmission and reception of the frame are able to be performed in parallel via the first frequency channel and the second frequency channel, and transmit the frame via the third frequency channel in a case where transmission and reception of the frame are not able to be performed in parallel via the first frequency channel and the second frequency channel.

Further features of the present disclosure will become apparent from the following description of example embodiments with reference to the attached drawings.

BRIEF DESCRIPTION OF THE DRAWINGS

FIG. 8 is a flowchart of processing for determining completion of determining a transmission frequency channel for use in transmitting a frame according to the first example embodiment.

DESCRIPTION OF THE EMBODIMENTS

Various example embodiments, features, and aspects of the present disclosure will be described in detail below with reference to the drawings. Furthermore, configurations illustrated in the following example embodiments are merely examples, and the present invention should not be construed to be limited to the illustrated configurations.

Figure 1:
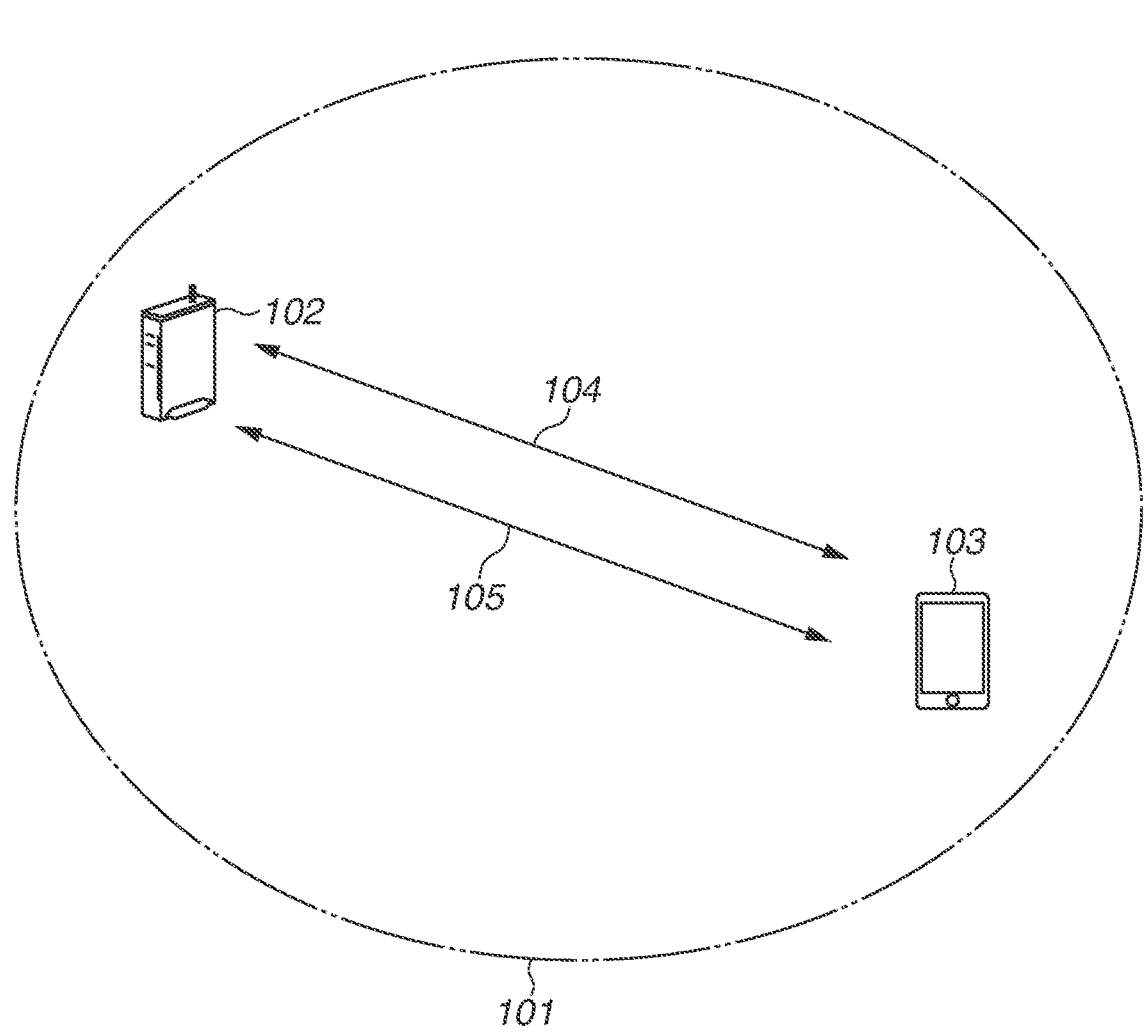
FIG. 1 is a diagram illustrating a configuration of a network which a communication apparatus establishes according to a first example embodiment.

FIG. 1 illustrates a configuration of a network that a communication apparatus 102 according to a first example embodiment establishes. The communication apparatus 102 is an access point (AP) which functions to establish a network 101. Furthermore, the network 101 is a wireless network.

Moreover, a communication apparatus 103 is a station (STA) which functions to participate in the network 101. Each of the communication apparatuses 102 and 103 is compatible with the IEEE 802.11be (EHT) standard, and is able to perform wireless communication compliant with the IEEE 802.11be standard via the network 101. Furthermore, IEEE is an abbreviation for Institute of Electrical and Electronics Engineers. Moreover, EHT is an abbreviation for Extremely High Throughput. Furthermore, EHT can be interpreted as an abbreviation for Extreme High Throughput. Each of the communication apparatuses 102 and 103 is able to perform communication in frequency bands of 2.4 gigahertz (GHz), 5 GHz, and 6 GHz. The frequency band which each of the communication apparatuses 102 and 103 uses is not limited to these bands, but can be a different frequency band such as 60 GHz. Moreover, each of the communication apparatuses 102 and 103 is able to perform communication with use of bandwidths of 20 megahertz (MHz), 40 MHz, 80 MHz, 160 MHz, and 320 MHz.

Moreover, each of the communication apparatuses 102 and 103 is a multi-link device (MLD). An MLD is a communication apparatus which is capable of performing communication with a communication partner apparatus via a plurality of frequency channels (104 and 105) in parallel.

The communication apparatuses 102 and 103 are able to implement multi-user (MU) communication, which multiplexes signals coming from a plurality of users, by performing OFDMA communication compliant with the IEEE 802.11be standard. OFDMA is an abbreviation for orthogonal frequency-division multiple access. In the OFDMA communication, parts of divided frequency bands (resource units (RUs)) are allocated to the respective STAs in such a way as not to overlap each other, and carrier waves allocated to the respective STAs are orthogonal. Therefore, an AP is able to perform communications with a plurality of STAs in parallel. Moreover, each of the communication apparatuses 102 and 103 is a multi-link device (MLD). An MLD is a communication apparatus which is capable of performing communication with a communication partner apparatus via a plurality of frequency channels in parallel.

Figure 2:
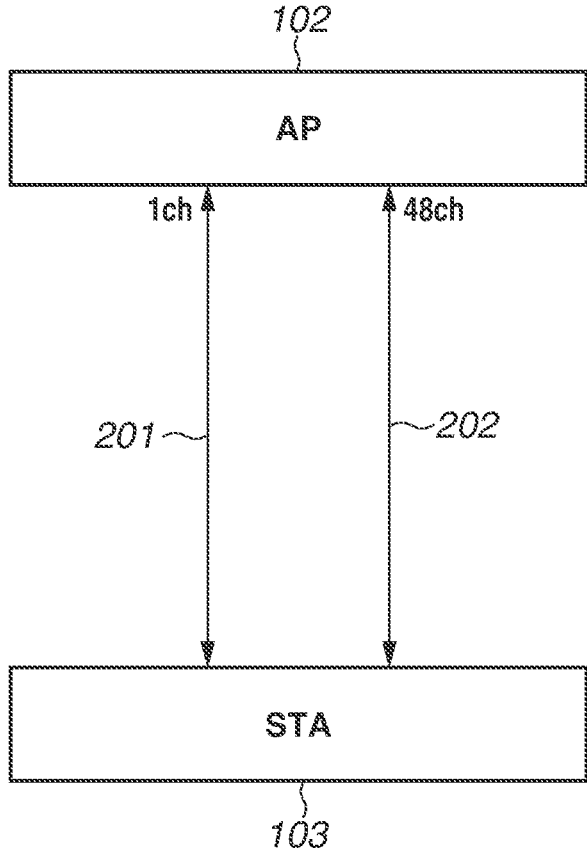
FIG. 2 is a diagram illustrating an example of a frequency channel configuration of the network which the communication apparatus establishes according to the first example embodiment.
Figure 3:
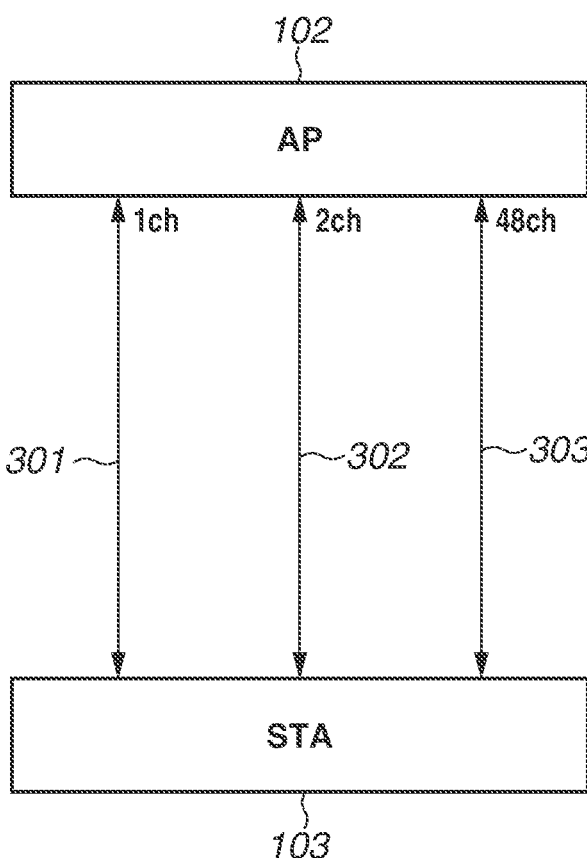
FIG. 3 is a diagram illustrating an example of a frequency channel configuration of the network which the communication apparatus establishes according to the first example embodiment.

FIG. 2 and FIG. 3 illustrate examples of frequency channel configurations of a network which the communication apparatus 102 establishes. The communication apparatuses 102 and 103 establish links via a plurality of frequency channels and thus perform multi-link communication. Here, the frequency channel is a frequency channel defined by the IEEE 802.11 series standard and refers to a frequency channel available for performing wireless communication compliant with the IEEE 802.11 series standard. In the IEEE 802.11 series standard, a plurality of frequency channels is defined for each of frequency bands of 2.4 GHz, 5 GHz, and 6 GHz. Moreover, in the IEEE 802.11 series standard, the bandwidth of each frequency channel is defined as 20 MHz. Furthermore, if bonding with an adjacent frequency channel is performed, a bandwidth of 40 MHz or more can be used for one frequency channel Referring to FIG. 2, the communication apparatus 102 and the communication apparatus 103 are connected to each other via a frequency channel 1*ch* (201) and a frequency channel 48*ch* (202). Referring to FIG. 3, the communication apparatus 102 and the communication apparatus 103 are connected to each other via a frequency channel 1*ch* (301), a frequency channel 2*ch* (302), and a frequency channel 48*ch* (303). In this way, the communication apparatus 102 establishes links using a plurality of frequency channels with the communication apparatus 103, thus enabling increasing a throughput in communication with the communication apparatus 103. Moreover, the communication apparatus 102 establishes a plurality of connections different in frequency band with the communication apparatus 103, so that, even when congestion is occurring in a given frequency band, the communication apparatus 102 is able to perform communication with the communication apparatus 103 in a frequency band other than the given frequency band. Therefore, the communication apparatus 102 is able to prevent a decrease in throughput in communication with the communication apparatus 103.

In the multi-link communication, a plurality of links which the communication apparatuses 102 and 103 respectively establish only needs to differ at least in frequency channel Furthermore, in the multi-link communication, a channel interval between frequency channels of a plurality of links which the communication apparatuses 102 and 103 respectively establish only needs to be larger than at least 20 MHz.

In the case of performing multi-link communication, the communication apparatus 102 divides one piece of data into a plurality of pieces of data and transmits the plurality of pieces of data to a communication partner apparatus via a plurality of links. Alternatively, the communication apparatuses 102 and 103 can transmit the same data via each of a plurality of links, thus setting a communication using one link as a backup communication for a communication using the other link. Specifically, the communication apparatus 102 is assumed to transmit, to the communication apparatus 103, the same data via a first link using the frequency channel 1*ch* and a second link using the frequency channel 48*ch*. In this case, for example, even when an error has occurred in a communication using the first link (1*ch*), since the communication apparatus 102 is transmitting the same data via the second link (48*ch*), the communication apparatus 103 is able to receive data transmitted from the communication apparatus 102. Alternatively, the communication apparatus 102 can use different links according to the type of a frame to be transmitted or the type of data to be transmitted. For example, the communication apparatus 102 can be configured to transmit a management frame via the first link (1*ch*) and transmit a data frame including data via the second link (48*ch*). Furthermore, the management frame refers to, specifically, a beacon frame, a probe request and response frame, and an association request frame and response frame. Moreover, in addition to these frames, a disassociation frame, an authentication frame, a de-authentication frame, and an action frame are also called the management frame. The beacon frame is a frame which serves to announce information about a network. Moreover, the probe request frame is a frame which serves to make a request for network information, and the probe response frame is a response to the request and is a frame which serves to provide network information. The association request frame is a frame which serves to make a request for connection, and the association response frame is a response to the request and is a frame which serves to indicate, for example, connection permission or connection error. The disassociation frame is a frame which serves to perform disconnection. The authentication frame is a frame which serves to authenticate a communication partner apparatus, and the de-authentication frame is a frame which serves to interrupt authentication of a communication partner apparatus and perform disconnection. The action frame is a frame which serves to perform an additional function other than the above-mentioned functions. The communication apparatuses 102 and 103 transmit and receive a management frame compliant with the IEEE 802.11 series standard. Alternatively, for example, in the case of transmitting data about a captured image, the communication apparatus 102 can be configured to transmit meta information, such as date and time, image capturing parameters (aperture value and shutter speed), and location information, via the first link and transmit image information via the second link.

Moreover, the communication apparatuses 102 and 103 can be configured to be able to perform multiple-input and multiple-output (MIMO) communication. In this case, each of the communication apparatuses 102 and 103 includes a plurality of antennas, and one of them transmits different signals from the respective antennas with use of the same frequency channel The receiving-side apparatus simultaneously receives all of the signals received from a plurality of streams with use of the plurality of antennas, and demultiplexes and decodes a signal for each stream. When performing MIMO communication in this way, the communication apparatuses 102 and 103 are able to communicate a larger number of pieces of data for the same amount of time than in the case of not performing MIMO communication. Moreover, in the case of performing multi-link communication, the communication apparatuses 102 and 103 can be configured to perform MIMO communication in some links.

Furthermore, the communication apparatuses 102 and 103 are assumed to be compatible with the IEEE 802.11be standard, but can be compatible with, in addition to or in place of this standard, at least any one of legacy standards which are standards preceding the IEEE 802.11be standard. The legacy standards are the IEEE 802.11a, 802.11b, 802.11g, 802.11n, 802.11ac, and 802.11ax standards. Furthermore, in the first example embodiment, at least any one of the IEEE 802.11a, 802.11b, 802.11g, 802.11n, 802.11ac, 802.11ax, and 802.11be standards and successor standards is referred to as the "IEEE 802.11 series standard". Moreover, the communication apparatuses 102 and 103 can be compatible with, in addition to the IEEE 802.11 series standard, another communication standard, such as Bluetooth®, NFC, UWB, Zigbee, or MBOA. Furthermore, UWB is an abbreviation for ultra-wide band, MBOA is an abbreviation for multi-band OFDM alliance. Furthermore, OFDM is an abbreviation for orthogonal frequency division multiplexing. Moreover, NFC is an abbreviation for near-field communication. UWB includes, for example, wireless Universal Serial Bus (USB), Wireless 1394, and Winet. Moreover, the communication apparatuses 102 and 103 can be compatible with a communication standard for wired communication, such as wired local area network (LAN).

Specific examples of the communication apparatus 102 include a wireless LAN router and a personal computer (PC), but are not limited to these. The communication apparatus 102 only needs to be any communication apparatus as long as it is capable of performing multi-link communication with another communication apparatus. Moreover, specific examples of the communication apparatus 103 include a camera, a tablet, a smartphone, a PC, a mobile phone, and a video camera, but are not limited to these. The communication apparatus 103 only needs to be a communication apparatus capable of performing wireless multi-link communication with another communication apparatus. Moreover, while each of the networks illustrated in FIG. 1, FIG. 2, and FIG. 3 is a network composed of one AP and one STA, the number of APs and the number of STAs are not limited to these.

Figure 4:
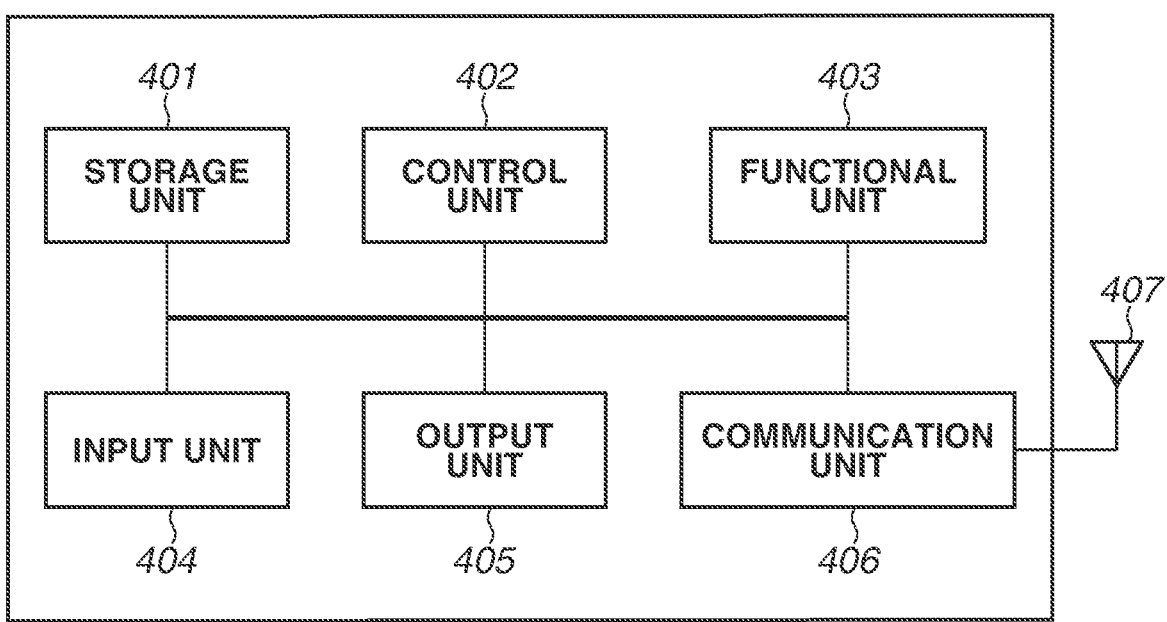
FIG. 4 is a diagram illustrating a hardware configuration of the communication apparatus according to the first example embodiment.

FIG. 4 illustrates a hardware configuration of the communication apparatus 102 in the first example embodiment. The communication apparatus 102 includes a storage unit 401, a control unit 402, a functional unit 403, an input unit 404, an output unit 405, a communication unit 406, and an antenna 407.

The storage unit 401 is configured with one or more memories, such as ROM or RAM, and stores a computer program for performing various operations described below and various pieces of information such as communication parameters for wireless communication. ROM is an abbreviation for read-only memory, and RAM is an abbreviation for random access memory. Furthermore, the storage unit 401 to be used includes, in addition to memories such as ROM and RAM, storage media such as a flexible disk, a hard disk, an optical disc, a magnetooptical disc, a compact disc ROM (CD-ROM), a CD recordable (CD-R), a magnetic tape, a non-volatile memory card, and a digital versatile disc (DVD). Moreover, the storage unit 401 can include, for example, a plurality of memories.

The control unit 402 is configured with, for example, one or more processors, such as a CPU or an MPU, and controls the entire communication apparatus 102 by executing the computer program stored in the storage unit 401. Furthermore, the control unit 402 can be configured to control the entire communication apparatus 102 by cooperation of the computer program stored in the storage unit 401 and an operating system (OS). Moreover, the control unit 402 generates data or a signal (wireless frame) to be transmitted in a communication with another communication apparatus. Furthermore, CPU is an abbreviation for central processing unit, and MPU is an abbreviation for micro processing unit. Moreover, the control unit 402 can be configured to include a plurality of processors, such as a multi-core processor, and control the entire communication apparatus 102 by the plurality of processors.

Moreover, the control unit 402 controls the functional unit 403 to perform predetermined processing, such as wireless communication, image capturing, printing, or projection. The functional unit 403 is hardware used for the communication apparatus 102 to perform predetermined processing.

The input unit 404 performs reception of various operations performed by the user. The output unit 405 performs various outputting operations to the user via a monitor screen or a loudspeaker. Here, the outputting operations of the output unit 405 can be, for example, displaying on a monitor screen, audio output by a loudspeaker, and vibration output. Furthermore, both the input unit 404 and the output unit 405 can be implemented by a single module, such as a touch panel. Moreover, each of the input unit 404 and the output unit 405 can be integral with the communication apparatus 102 or can be separate from the communication apparatus 102.

The communication unit 406 performs control of wireless communication compliant with the IEEE 802.11be standard. Moreover, the communication unit 406 can perform control of wireless communication compliant with, in addition to the IEEE 802.11be standard, another IEEE 802.11 series standard or perform control of wired communication such as wired LAN. The communication unit 406 controls the antenna 407 to perform transmission and reception of a signal for wireless communication generated by the control unit 402. Furthermore, in a case where the communication apparatus 102 is compatible with, in addition to the IEEE 802.11be standard, for example, the NFC standard or the Bluetooth® standard, the communication unit 406 can perform control of a wireless communication compliant with these standards. Moreover, in a case where the communication apparatus 102 is capable of performing wireless communications compliant with a plurality of communication standards, the communication apparatus 102 can be configured to include individual communication units and antennas compatible with the respective communication standards. The communication apparatus 102 communicates data, such as image data, document data, or video data, with the communication apparatus 103 via the communication unit 406. Furthermore, the antenna 407 can be configured as a member separate from the communication unit 406 or can be configured as a single module integral with the communication unit 406.

The antenna 407 is an antenna available for communications in frequency bands of 2.4 GHz, 5 GHz, and 6 GHz. In the first example embodiment, the communication apparatus 102 includes one antenna, but can be configured to include different antennas for respective frequency bands. Moreover, in a case where the communication apparatus 102 includes a plurality of antennas, the communication apparatus 102 can include communication units 406 compatible with the respective antennas.

Furthermore, the communication apparatus 103 has a hardware configuration similar to that of the communication apparatus 102.

Figure 5:
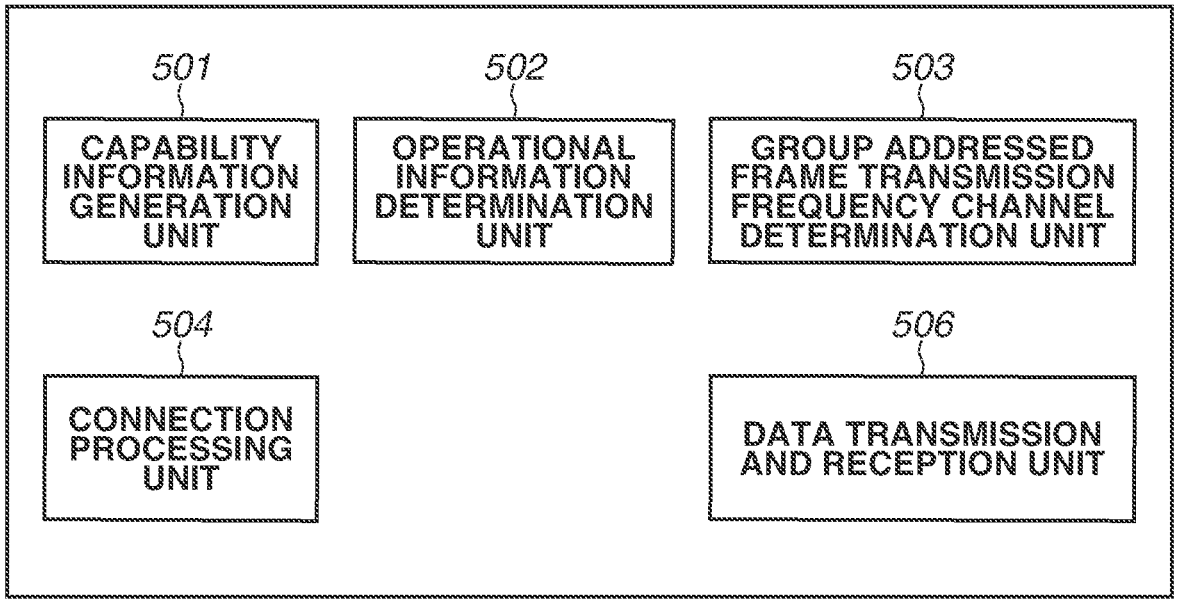
FIG. 5 is a diagram illustrating a functional configuration of the communication apparatus according to the first example embodiment.

FIG. 5 illustrates a functional configuration of the communication apparatus 102 in the first example embodiment. The communication apparatus 102 is configured with a capability information generation unit 501 for multi-link communication, an operational information determination unit 502 for multi-link communication, a group addressed frame transmission frequency channel determination unit 503, a connection processing unit 504, and a data transmission and reception unit 506.

The capability information generation unit 501 is a block which generates capability information regarding multi-link communication about the communication apparatus 102. The communication apparatus 102 generates capability information for communicating a capability regarding multi-link communication about the communication apparatus 102 itself to another communication apparatus. Here, the capability information refers to a frequency band, a frequency channel, and a bandwidth which the communication apparatus 102 is able to use. Furthermore, with regard to the capability information, the communication apparatus 102 can communicate capability information about the communication apparatus 102 itself to another communication apparatus, or can only receive capability information about a communication partner apparatus from another communication apparatus.

The operational information determination unit 502 is a block which determines operational information regarding multi-link communication with a communication partner apparatus based on capability information regarding multi-link communication about the communication apparatus 102 itself and the communication partner apparatus. The operational information regarding multi-link communication refers to, for example, a frequency channel and a bandwidth for use in multi-link communication between the communication apparatuses 102 and 103. With regard to the operational information, the communication apparatus 102 can be configured to communicate the determined operational information to a communication partner apparatus or can be configured not to communicate the determined operational information thereto.

The group addressed frame transmission frequency channel determination unit 503 is a block which determines a frequency channel targeted for transmitting a group addressed frame. The group addressed frame transmission frequency channel determination unit 503 determines the frequency channel targeted for transmitting a group addressed frame, based on information regarding connection about a frequency channels obtained from the capability information generation unit 501 or the connection processing unit 504. Here, the group addressed frame refers to a frame including an address the group bit of which is "1" in a media access control (MAC) address included in a destination address (DA) of an MAC frame. For example, a broadcast frame such as a beacon frame is a type of group addressed frame because the group bit thereof is "1". Moreover, a multicast frame is also a group addressed frame because the group bit thereof is also "1". The group addressed frame is transmitted by multicast communication or broadcast communication.

The connection processing unit 504 is a block which performs processing for causing the communication apparatus 103, which is an STA, to participate in a network established by the communication apparatus 102. Specifically, for example, the connection processing unit 504 causes the communication apparatus 102 to transmit an association response frame as a response to an association request, which is a connection request received from the communication apparatus 103. Furthermore, the communication apparatus 102 can include connection processing units 504 respectively corresponding to a plurality of links for which the communication apparatus 102 itself establishes connection, or can use a single connection processing unit 504 in a time-sharing manner The data transmission and reception unit 506 is a block which performs transmission and reception of a data frame in multi-link communication based on operational information regarding multi-link communication determined by the operational information determination unit 502.

Furthermore, the communication apparatus 103 has a functional configuration similar to that of the communication apparatus 102, but differs in the following respects.

The communication apparatus 103 includes a request information determination unit (not illustrated) instead of the operational information determination unit 502. The request information determination unit is a block which determines request information regarding multi-link communication with a communication partner apparatus based on respective pieces of capability information regarding multi-link communication about the communication apparatus 103 and the communication partner apparatus. The request information regarding multi-link communication refers to, for example, a frequency channel and a bandwidth to be requested for use in multi-link communication between the communication apparatuses 102 and 103. With regard to the request information, the communication apparatus 103 can be configured to communicate the determined request information to a communication partner apparatus or can be configured not to communicate the determined request information.

Figure 6:
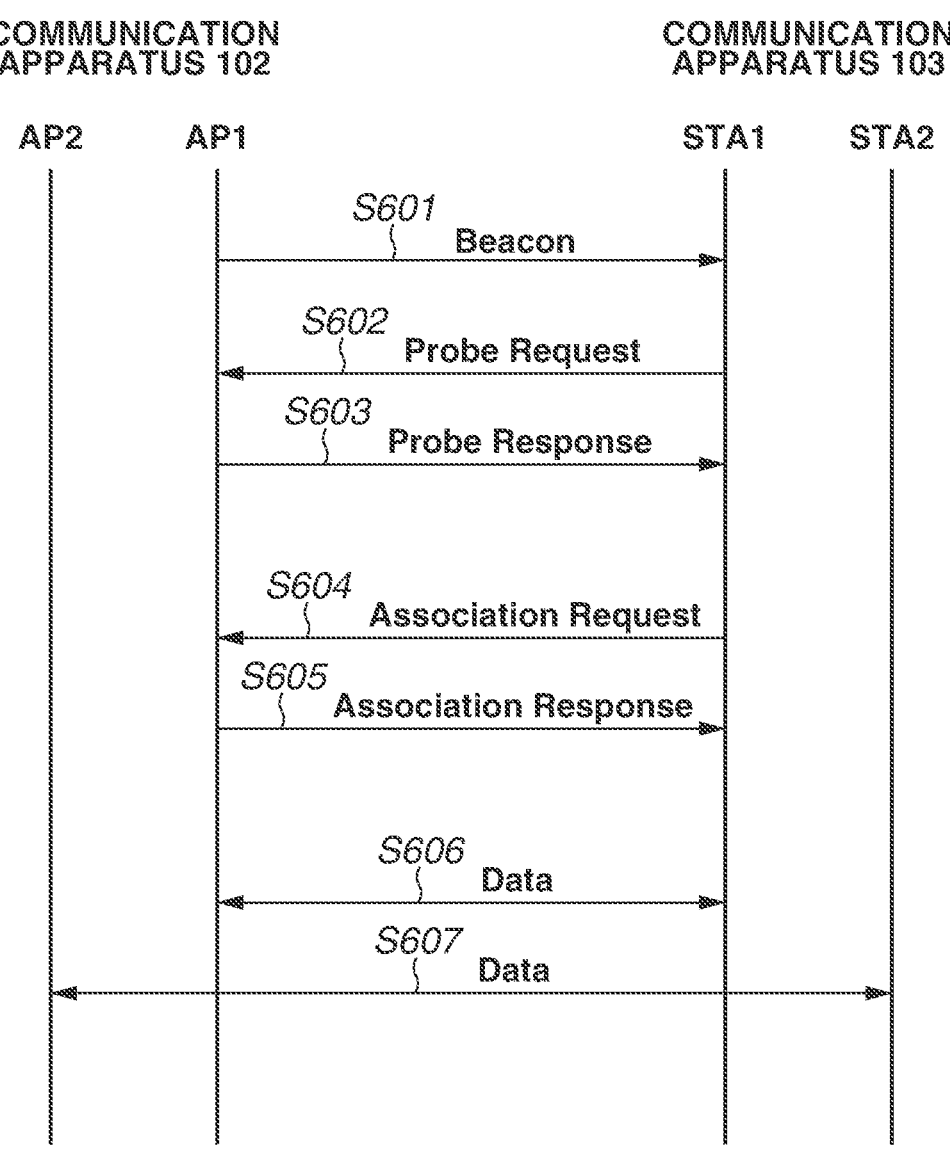
FIG. 6 is a sequence diagram illustrating an example of processing which the communication apparatus and another communication apparatus perform when performing multi-link communication according to the first example embodiment.

FIG. 6 is a sequence diagram illustrating an example of processing which the communication apparatus 102 and the communication apparatus 103 perform when performing multi-link communication.

FIG. 6 illustrates an example in which the communication apparatus 102 and the communication apparatus 103 perform communication using the frequency channel 1*ch* with a frequency band of 2.4 GHz in the first link and performs communication using the frequency channel 36*ch* with a frequency band of 5 GHz in the second link.

Processing in the present sequence is started in response to both the communication apparatuses 102 and 103 being powered on. Alternatively, at least one of the communication apparatuses 102 and 103 can start the processing in response to an instruction for starting multi-link communication being received from the user or an application. Alternatively, at least one of the communication apparatuses 102 and 103 can start the processing in response to the data amount of data to be communicated to a communication partner apparatus having become greater than or equal to a predetermined threshold value.

First, in step S601, the communication apparatus 102 transmits a beacon signal including network information about the communication apparatus 102 itself in the frequency channel 1*ch*, thus announcing the network information to nearby STAs. The network information is, specifically, a transmission interval at which the communication apparatus 102 transmits a beacon signal or an SSID of the communication apparatus 102. SSID is an abbreviation for service set identifier. Additionally, the communication apparatus 102 can cause network information to be included in a beacon signal and thus announce capability information regarding multi-link communication about the communication apparatus 102.

In step S602, upon receiving the beacon signal transmitted by the communication apparatus 102 in the frequency channel 1*ch*, the communication apparatus 103 transmits a probe request in the frequency channel 1*ch*. The probe request includes an SSID of the communication apparatus 103. Moreover, in addition to the SSID, the communication apparatus 103 communicates capability information regarding multi-link communication about the communication apparatus 103.

Upon receiving the probe request, in step S603, the communication apparatus 102 transmits, as a response thereto, a probe response to the communication apparatus 103 in the frequency channel 1*ch*. In a case where the communication apparatus 102 does not cause capability information regarding multi-link communication to be included in a beacon signal, the communication apparatus 102 causes the capability information to be included in a probe response and then transmits the probe response. Alternatively, the communication apparatus 102 can be configured to cause only some pieces of capability information regarding multi-link communication to be included in a beacon signal and cause the remaining pieces of capability information or all of the pieces of capability information to be included in a probe response.

When performing processing in steps S601 to S603, the communication apparatuses 102 and 103 are able to exchange respective pieces of capability information regarding multi-link communication about the communication apparatuses 102 and 103.

Next, in step S604, the communication apparatus 103 transmits an association request, which is a connection request, to the communication apparatus 102 in the frequency channel 1*ch*. In this case, the communication apparatus 103 can cause capability information regarding multi-link communication to be included in an association request and then communicate capability information regarding multi-link communication about the communication apparatus 103.

Here, the capability information regarding multi-link communication is, for example, a multi-link element. Furthermore, the communication apparatus 103 can determine capability information, which is to be transmitted in step S604, based on capability information regarding multi-link communication about the communication apparatus 102 acquired in at least one of steps S601 and S603. For example, even in a case where the communication apparatus 103 is able to combine links using a frequency band of 2.4 GHz and a frequency band of 5 GHz in multi-link communication, the communication apparatus 102 is assumed to be compatible with only a plurality of links in a frequency band of 2.4 GHz. In this case, the communication apparatus 103 can transmit, as capability information which is to be transmitted in step S604, only capability information regarding establishment of a plurality of links in a frequency band of 2.4 GHz. Moreover, while, in the first example embodiment, in step S602, the communication apparatus 103 transmits capability information regarding multi-link communication about the communication apparatus 103 itself, the first example embodiment is not limited to this, and the communication apparatus 103 can be configured not to transmit the capability information in step S602 and can be configured to transmit the capability information only in step S604. Alternatively, the communication apparatus 103 can cause capability information regarding multi-link communication to be included in the association request and thus transmit, instead of the capability information, request information for making a request in performing multi-link communication. The request information for making a request by the communication apparatus 103 can be indicated by the capability information regarding multi-link communication or can be indicated by another element.

Upon receiving the association request, in step S605, the communication apparatus 102 transmits, as a response thereto, an association response to the communication apparatus 103 in the frequency channel 1*ch*. The association response which is transmitted in step S605 includes operational information determined by the communication apparatus 102, which is used for performing multi-link communication with the communication apparatus 103. Moreover, in a case where, in step S604, the communication apparatus 103 serving as an STA has transmitted an association request including a request for operational information, the communication apparatus 102 can transmit an association response including only the allowance or denial of the request.

In a case where the communication apparatus 103 is able to perform multi-link communication using operational information included in the association response, in step S606, the communication apparatuses 102 and 103 establish a link using the frequency channel 1*ch* and then start data communication. Moreover, in this instance, in a case where operational information for a link using the frequency channel 36*ch* is included in the operational information transmitted by the communication apparatus 102, in step S607, the communication apparatuses 102 and 103 also establish a link using the frequency channel 36*ch* and then start data transmission.

Furthermore, in a case where, in step S605, the communication apparatus 102 has shown allowance to the communication apparatus 103 with respect to request information transmitted in step S604, processing in step S606 is also performed in a similar way. Moreover, in a case where request information regarding a link using the frequency channel 36*ch* is also included in request information transmitted by the communication apparatus 103 in step S604, processing in step S607 is performed.

While, in the first example embodiment, two links have been established by transmission and reception of a frame in one frequency channel, the first example embodiment is not limited to this, and three or more links can be established.

Moreover, while, in the first example embodiment, a case where the communication apparatuses 102 and 103 start multi-link communication with a state in which a link has not yet been established between the communication apparatuses 102 and 103 has been described, the first example embodiment is not limited to this.

The communication apparatuses 102 and 103 can establish a new link in addition to the link already established and then start multi-link communication. In this instance, in a case where the communication apparatus 103 serving as an STA has already acquired capability information regarding multi-link communication about the communication apparatus 102 serving as an AP, the communication apparatus 103 can start processing with step S604. Alternatively, in a case where the communication apparatus 102 has already acquired capability information regarding multi-link communication about the communication apparatus 103, the communication apparatus 102 can transmit a signal for causing the communication apparatus 103 to transmit an association request, thus enabling the communication apparatus 103 to start processing with step S604. Alternatively, the communication apparatuses 102 and 103 can establish a new link in addition to a plurality of links already established. In these cases, the sequence illustrated in FIG. 6 can be started with step S604.

Moreover, while, in the first example embodiment, a case where links using a plurality of frequency channels are established by transmission and reception of a frame in one frequency channel has been described, the first example embodiment is not limited to this. In the case of performing multi-link communication, the communication apparatuses 102 and 103 can remove links using a plurality of frequency channels already established, by transmission and reception of a frame using one frequency channel.

As described above with reference to FIG. 6, the communication apparatuses 102 and 103 are able to control, by transmission and reception of a frame via a given frequency channel (or link), establishment or removal of a link in another frequency channel Moreover, the communication apparatuses 102 and 103 are able to control, by transmission and reception of a frame via a given frequency channel (or link), establishment or removal of links in a plurality of frequency channels.

Moreover, in the sequence illustrated in FIG. 6, the transmitter apparatus can cause a multi-link device (MLD) MAC address of the transmitter apparatus itself to be included in at least one of the above-mentioned management frames which are transmitted in steps S601 to S605. The MLD MAC address is identification information about a communication apparatus capable of performing multi-link communication.

Moreover, the transmitter apparatus can cause an MLD MAC address of the transmitter apparatus itself to be included in at least one of frames other than the management frames which are transmitted in steps S601 to S605.

Figure 7:
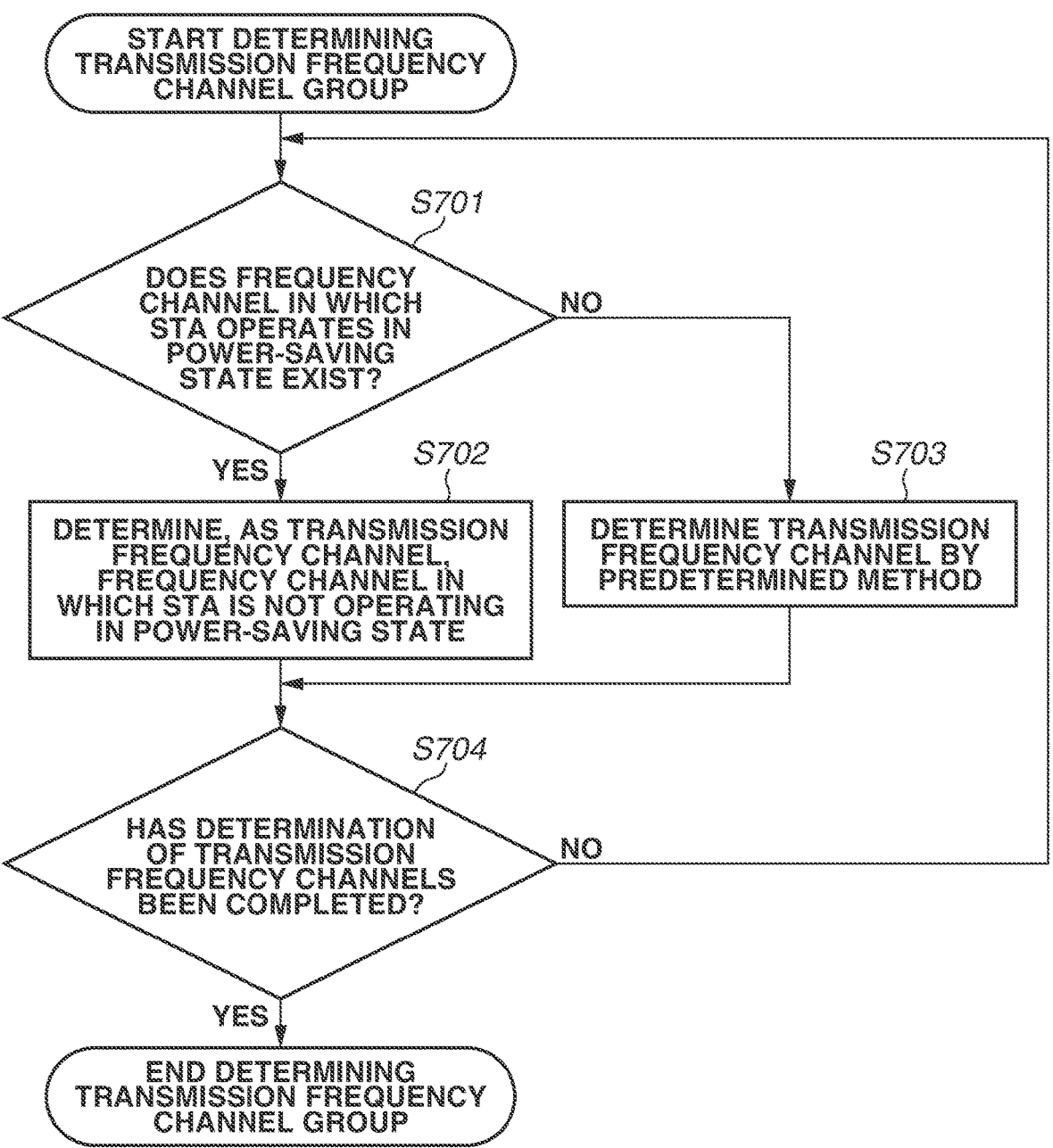
FIG. 7 is a flowchart of processing for determining a transmission frequency channel for use in transmitting a frame according to the first example embodiment.

FIG. 7 is a flowchart illustrating the flow of processing which is performed by the control unit 402 executing a program stored in the storage unit 401 of the communication apparatus 102. In the first example embodiment, an example in which an AP determines a frequency channel for use in transmitting a frame, based on whether a frequency channel in which an STA operates in the power-saving state exists. Here, the frequency channel in which an STA operates in the power-saving state refers to a frequency channel in which transmission and reception of a frame are not able to be performed. Moreover, the STA stores, in a data frame, information indicating that the STA enters into the power-saving state and transmits the data frame to the AP, thus communicating that effect.

The present flowchart is started by the communication apparatus 102 transmitting a group addressed frame. Alternatively, the present flowchart can be started when a connection configuration between the communication apparatus 102 and another communication apparatus has changed. When the connection configuration has changed refers to, for example, when a connection with another communication apparatus has been started in a new link or when a connection with another communication apparatus has been removed.

In step S701, the communication apparatus 102 determines whether a frequency channel in which an STA operates in the power-saving state exists.

Next, if, in step S701, it is determined that a frequency channel in which the STA operates in the power-saving state exists (YES in step S701), then in step S702, the communication apparatus 102 determines a frequency channel in which the STA is not operating in the power-saving state, as a frequency channel for use in transmitting a frame.

Referring to FIG. 2 for the sake of explanation, for example, if it is determined that the communication apparatus 103 operates in the power-saving state in the frequency channel 1*ch*, the communication apparatus 102 determines the frequency channel 48*ch* as a frequency channel for use in transmitting a frame and thus do not transmit a frame in the frequency channel 1*ch*. If, in step S701, it is determined that any frequency channel in which the STA operates in the power-saving state does not exist (NO in step S701), then in step S703, the communication apparatus 102 determines a frequency channel for use in transmitting a frame, by a predetermined method. In step S703, the communication apparatus 102 can select one frequency channel in a random manner as a frequency channel for use in transmitting a frame, can select a frequency channel for use in transmitting a frame based on the order of frequency channel numbers, or can select a frequency channel by a different determination method. As a different determination method, for example, the communication apparatus 102 can select a frequency channel which is able to be used for transmitting a frame to the largest number of STAs. Moreover, the communication apparatus 102 can select a frequency channel which is low in congestion degree, or can select a frequency channel while avoiding frequency channels of non-STR. The frequency channels of non-STR are described below in detail in a third example embodiment described below. Moreover, in a case where a plurality of frequency channels in which an STA operates in the power-saving state exits, the communication apparatus 102 can also determine a frequency channel for use in transmitting a frame by the above-mentioned methods.

Upon selecting a frequency channel for use in transmitting a frame in step S702 or S703, then in step S704, the communication apparatus 102 determines whether the determination of frequency channels for use in transmitting a frame has been completed with respect to all of the STAs which have established connection with the AP. The detailed flow of step S704 is described below with reference to FIG. 8. If, in step S704, it is determined that the determination of frequency channels for use in transmitting a frame has been completed (YES in step S704), the communication apparatus 102 ends processing in the present flowchart. If, in step S704, it is determined that the determination of frequency channels for use in transmitting a frame has not yet been completed (NO in step S704), the communication apparatus 102 returns the processing to step S701, thus selecting a frequency channel for use in transmitting a frame.

As described above, according to the first example embodiment, in a case where a frequency channel in which an STA operates in the power-saving state exits, the communication apparatus 102 is able to select a frequency channel for use in transmitting a frame while avoiding the existing frequency channel Additionally, with avoiding the existing frequency channel, the communication apparatus 102 is able to prevent or reduce processing for starting up a communication apparatus in which some functions thereof are in the power-saving state and bringing such a communication apparatus into a state of being able to receive a frame.

FIG. 8 is a flowchart illustrating the flow of processing which is performed by the control unit 402 executing a program stored in the storage unit 401 of the communication apparatus 102. In the present flowchart, an AP determines whether, when a frequency channel for use in transmitting a group addressed frame has been determined, a group addressed frame is transmitted to an STA which has established connection with the AP. In the first example embodiment, an example in which, in a case where one AP and one STA have established connection with each other via two frequency channels, the AP determines a frequency channel for use in transmitting a group addressed frame has been described. However, in a case where an AP and a plurality of STAs have established connection with each other via a plurality of frequency channels, if the AP transmits the frame in a frequency channel determined in step S702 or S703, some STAs may be unable to receive the frame. Therefore, the communication apparatus 102 uses the present flowchart to determine whether an STA which does not receive the frame does not exist.

In each of frequency channels via which the communication apparatus 102 has established connection with the communication apparatus 103, the communication apparatus 102 has acquired an MLD MAC address of the communication apparatus 103 at the time of establishment of connection. Referring to the configuration example illustrated in FIG. 2 for the sake of explanation, for example, since the communication apparatus 103 is connecting to the communication apparatus 102 in the frequency channel 1*ch* and the frequency channel 48*ch*, the communication apparatus 102 has acquired two MLD MAC addresses from the communication apparatus 103.

In step S801, the communication apparatus 102 acquires a first MAC address group which is MAC addresses of STAs with which the communication apparatus 102 has established connection in the determined frequency channels for use in transmitting a frame. In the first example embodiment, an MLD MAC address is used as a MAC address of each STA.

Next, in step S802, the communication apparatus 102 acquires a second MAC address group which is MAC addresses of all of the STAs with which the communication apparatus 102 has established connection in all of the frequency channels. Furthermore, the communication apparatus 102 can acquire the first MAC address group and the second MAC address group not at the timing of determining the completion of determination of a frequency channel group for use in transmitting a frame but the communication apparatus 102 can previously acquire the first MAC address group. For example, the communication apparatus 102 can acquire the first MAC address group when establishing new connection with an STA or when removing connection with an STA.

Next, in step S803, the communication apparatus 102 determines whether the first MAC address group and the second MAC address group coincide with each other. If, in step S803, it is determined that the first MAC address group and the second MAC address group coincide with each other (YES in step S804), then in step S804, the communication apparatus 102 determines that the determination of frequency channels for use in transmitting a frame has been completed. Upon determining that the determination of frequency channels for use in transmitting a frame has been completed in step S804, the communication apparatus 102 ends the flow of determination of frequency channels for use in transmitting a frame without transmitting a frame in frequency channels other than the determined frequency channels for use in transmitting a frame.

If, in step S803, it is determined that the first MAC address group and the second MAC address group do not coincide with each other (NO in step S804), then in step S805, the communication apparatus 102 determines that the determination of frequency channels for use in transmitting a frame has not yet been completed, and then ends the flow of determination of frequency channels for use in transmitting a frame.

Furthermore, while, in FIG. 8, an example in which the communication apparatus 102 determines the completion of determination with use of MAC addresses has been described, the first example embodiment is not limited to this, and the communication apparatus 102 can determine the completion of determination with use of multi-link information which an AP and an STA share when establishing connection. Moreover, the communication apparatus 102 can determine the completion of determination of a frequency channel for use in transmitting a frame with use of the MAC address of an STA.

In the first example embodiment, an example in which, in a state in which an AP and an STA have established connection via a plurality of frequency channels, if a frequency channel in which the STA operates in the power-saving state exists, the AP avoids the existing frequency channel has been described. In a second example embodiment, an example in which, in frequency channels in which an AP and an STA have established connection, the SP determines a frequency channel for use in transmitting a frame while avoiding a frequency channel which is high in congestion degree is described.

Figure 9:
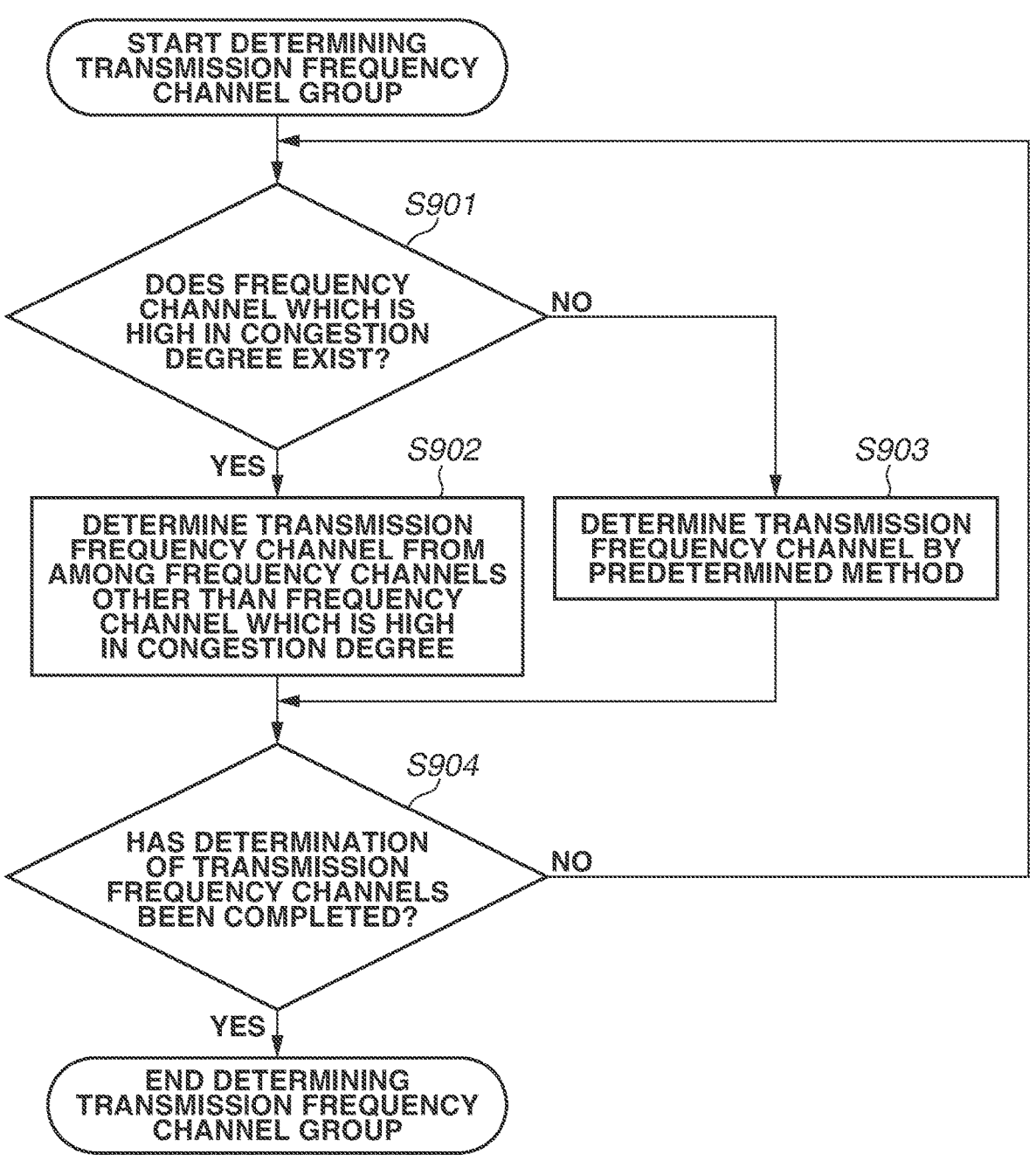
FIG. 9 is a flowchart of processing for determining a transmission frequency channel for use in transmitting a frame according to a second example embodiment.

FIG. 9 is a flowchart illustrating the flow of processing which is performed by the control unit 402 executing a program stored in the storage unit 401 of the communication apparatus 102.

In step S901, the communication apparatus 102 determines whether a frequency channel which is high in congestion degree exists in frequency channels via which the communication apparatus 102 has established connection with the communication apparatus 103.

If, in step S901, it is determined that a frequency channel which is high in congestion degree exists (YES in step S901), then in step S902, the communication apparatus 102 determines a frequency channel for use in transmitting a frame from among frequency channels other than the frequency channel which is high in congestion degree. Referring to FIG. 2 for the sake of explanation, for example, if it is determined that the frequency channel 1ch is a frequency channel which is high in congestion degree, the communication apparatus 102 determines the frequency channel 48ch as a frequency channel for use in transmitting a frame and thus does not transmit a frame in the frequency channel 1ch. If, in step S901, it is determined that any frequency channel which is high in congestion degree does not exist (NO in step S901), then in step S903, the communication apparatus 102 determines a frequency channel for use in transmitting a frame by a predetermined method. In step S903, the communication apparatus 102 can select one frequency channel in a random manner as a frequency channel for use in transmitting a frame, can select a frequency channel for use in transmitting a frame based on the order of frequency channel numbers, or can select a frequency channel by a different determination method. As a different determination method, for example, the communication apparatus 102 can select a frequency channel which is able to be used for transmitting a frame to the largest number of STAs. Moreover, as with the first example embodiment, the communication apparatus 102 can select a frequency channel in which an STA is not operating in the power-saving state, or can select a frequency channel other than frequency channels of non-STR. The frequency channels of non-STR are described below in detail in a third example embodiment described below. Moreover, in a case where a plurality of frequency channels which is bad in communication situation and is high in congestion degree exists, the communication apparatus 102 can also determine a frequency channel for use in transmitting a frame by the above-mentioned methods.

With regard to the congestion degree of a frequency channel, for example, the communication apparatus 102 counts the number of probe requests a response to which has been received from among probe requests transmitted in each frequency channel, thus being able to estimate the congestion degree of each frequency channel Moreover, the communication apparatus 102 can count the number of beacon signals observed within a predetermined period in each frequency channel, thus estimating the congestion degree of each frequency channel. Additionally, the communication apparatus 102 can estimate the congestion degree of each frequency channel by, for example, counting of the number of times of carrier sense within a predetermined period or information exchange with another AP. Moreover, the communication apparatus 102 can estimate the congestion degree of each frequency channel by a noise level obtained in a state in which there is no signal received. In a case where an STA estimates the congestion degree, the STA communicates information about congestion degree obtained by calculation to an AP, and the AP estimates the congestion degree of each frequency channel based on the information about congestion degree received from the STA.

The flow in step S904 and subsequent steps is similar to step S704 and subsequent steps described with reference to FIG. 7, and is, therefore, omitted from description here.

As described above, according to the second example embodiment, the communication apparatus 102 is able to determine a frequency channel for use in transmitting a frame while avoiding a frequency channel which is high in congestion degree in a link between an AP and an STA. With avoiding a frequency channel which is high in congestion degree, the communication apparatus 102 is able to prevent or reduce packet loss and prevent or reduce retransmission processing for a packet occurring at the time of packet loss.

In the second example embodiment, an example in which, in a state in which an AP and an STA have established connection via a plurality of frequency channels, the AP determines a frequency channel for use in transmitting a frame while avoiding a frequency channel which is high in congestion degree has been described. In a third example embodiment, an example in which, when an AP and an STA have established connection via a plurality of frequency channels, the AP determines a frequency channel for use in transmitting a frame while avoiding frequency channels which become not STR if transmission of a frame is performed is described. Here, STR is an abbreviation for simultaneous transmit and receive. Hereinafter, frequency channels which are not STR are referred to as "frequency channels of non-STR".

Furthermore, the frequency channels of non-STR refer to a set of frequency channels which are in a state in which, during the process of data transmission in a first frequency channel, data is unable to be received in a second frequency channel. Moreover, the frequency channels of non-STR also refer to a set of frequency channels which are in a state in which, during the process of data reception in a first frequency channel, data is unable to be transmitted in a second frequency channel. For example, in a case where the frequencies or channels of a first frequency channel and a second frequency channel are close to each other, the frequencies or channels may influence each other, so that the first frequency channel and the second frequency channel may become unavailable for transmission and reception and may become non-STR. Moreover, for example, in a case where the transmission output of a frame to be transmitted in the first frequency channel is large, such a large transmission output may influence the second frequency channel, so that the first frequency channel and the second frequency channel may become non-STR. In the first frequency channel and the second frequency channel which become non-STR, when data transmission and reception are performed, it may become necessary to perform synchronous processing for transmission and reception in such a way as to prevent transmission and reception from overlapping each other in the respective links.

Figure 10:
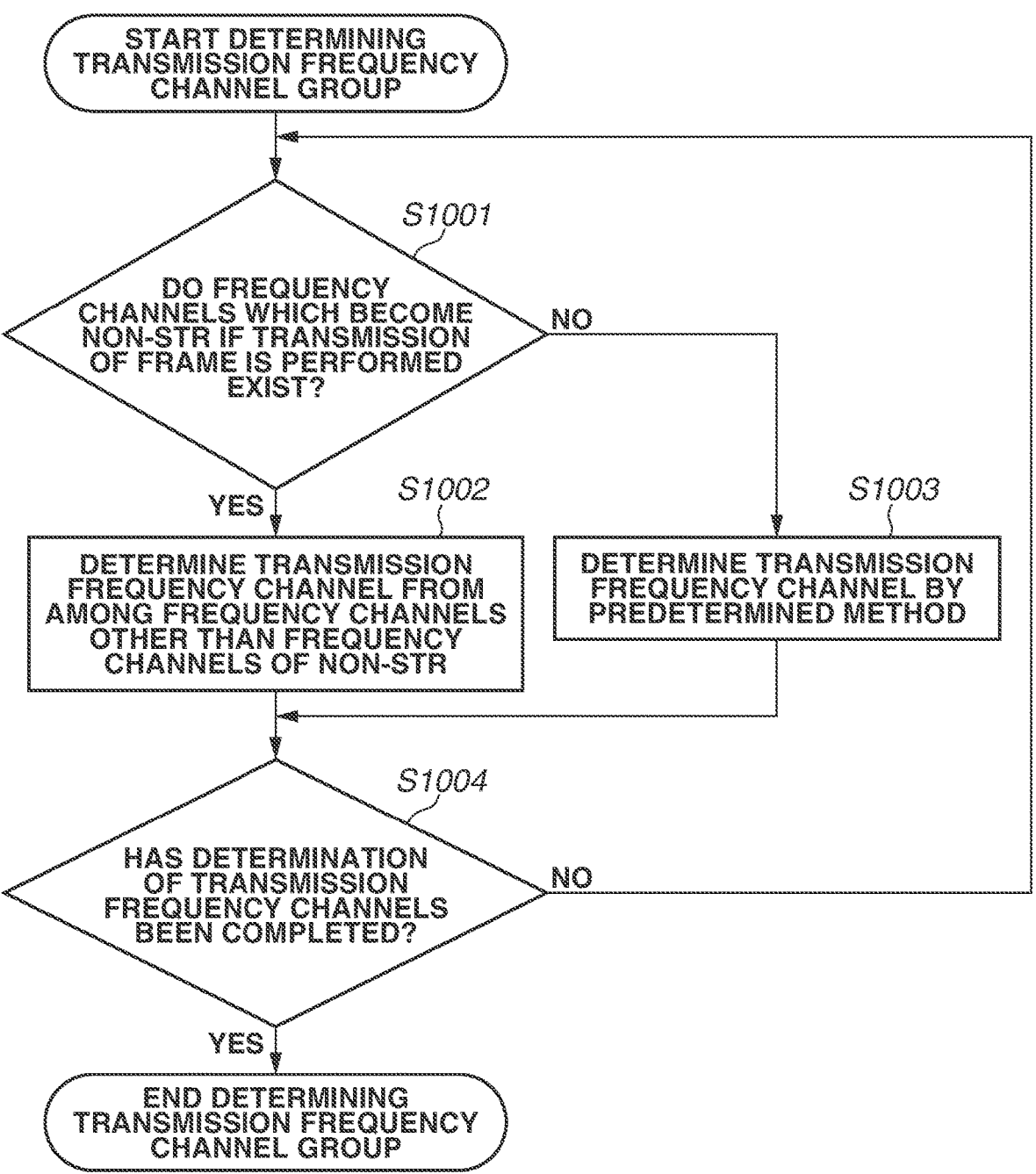
FIG. 10 is a flowchart of processing for determining a transmission frequency channel for use in transmitting a frame according to a third example embodiment.

FIG. 10 is a flowchart illustrating the flow of processing which is performed by the control unit 402 executing a program stored in the storage unit 401 of the communication apparatus 102.

In step S1001, the communication apparatus 102 determines whether frequency channels which become non-STR if transmission of a frame is performed exist.

If, in step S1001, it is determined that frequency channels which become non-STR if transmission of a frame is performed exist (YES in step S1001), then in step S1002, the communication apparatus 102 determines a frequency channel for use in transmitting a frame from among frequency channels other than the frequency channels of non-STR. Referring to FIG. 3 for the sake of explanation, for example, in a case where it is determined that, if a frame is transmitted in the frequency channel 1ch, the frequency channel 1ch and the frequency channel 2ch become non-STR, the communication apparatus 102 determines the frequency channel 48ch as a frequency channel for use in transmitting a frame, and thus does not transmit a frame in the frequency channel 1ch and the frequency channel 2ch.

If, in step S1001, it is determined that any frequency channels which become non-STR if transmission of a frame is performed do not exist (NO in step S1001), then in step S1003, the communication apparatus 102 determines a frequency channel for use in transmitting a frame, by a predetermined method. In step S1003, the communication apparatus 102 can select one frequency channel in a random manner as a frequency channel for use in transmitting a frame, can select a frequency channel for use in transmitting a frame based on the order of frequency channel numbers, or can select a frequency channel by a different determination method. As a different determination method, the communication apparatus 102 can select a frequency channel which is able to be used for transmitting a frame to the largest number of STAs. Moreover, as with the first example embodiment, the communication apparatus 102 can select a frequency channel in which an STA does not operate in the power-saving state, or, as with the second example embodiment, the communication apparatus 102 can select a frequency channel which is low in congestion degree. Moreover, in a case where, in step S1001, it is determined that only frequency channels of non-STR exist, the communication apparatus 102 can determine a frequency channel for use in transmitting a frame from among the frequency channels of non-STR by the above-mentioned methods.

The flow in step S1004 and subsequent steps is similar to step S704 and subsequent steps illustrated in FIG. 7, and is, therefore, omitted from description.

Furthermore, while, in the third example embodiment, a case where, as illustrated in FIG. 3, one AP and one STA have established connection via three frequency channels has been described, the third example embodiment is not limited to this. Moreover, in a state in which an STA1 has established connection with the AP via the frequency channel 1ch and the frequency channel 10ch and an STA2 has established connection with the AP via the frequency channel 2ch and the frequency channel 11ch, if a frame is to be transmitted in the frequency channel 1ch, the frequency channel 1ch is a frequency channel of non-STR with respect to the AP, but may be a frequency channel of STR with respect to the STAs. In this case, the communication apparatus 102 can also determine a frequency channel for use in transmitting a frame by the above-mentioned methods.

As described above, according to the third example embodiment, the communication apparatus 102 is able to determine a frequency channel for use in transmitting a frame while avoiding frequency channels which may become non-STR if transmission of a frame is performed. Additionally, since the communication apparatus 102 is able to avoid frequency channels which may become non-STR, the communication apparatus 102 is able to prevent or reduce performing synchronous processing for preventing transmission and reception from overlapping each other in the respective links.

In the first example embodiment, an example in which, in a state in which an AP and an STA have established connection via a plurality of frequency channels, if a frequency channel in which the STA operates in the power saving state exits, the AP avoids using the frequency channel has been described. In a fourth example embodiment, an example in which, while the AP prevents or reduces transmitting a frame via a frequency channel in which an STA operates in the power saving state, the AP determines a frequency channel for use in transmitting a frame while reducing the number of frequency channels for use in transmitting the frame is described.

Figure 11:
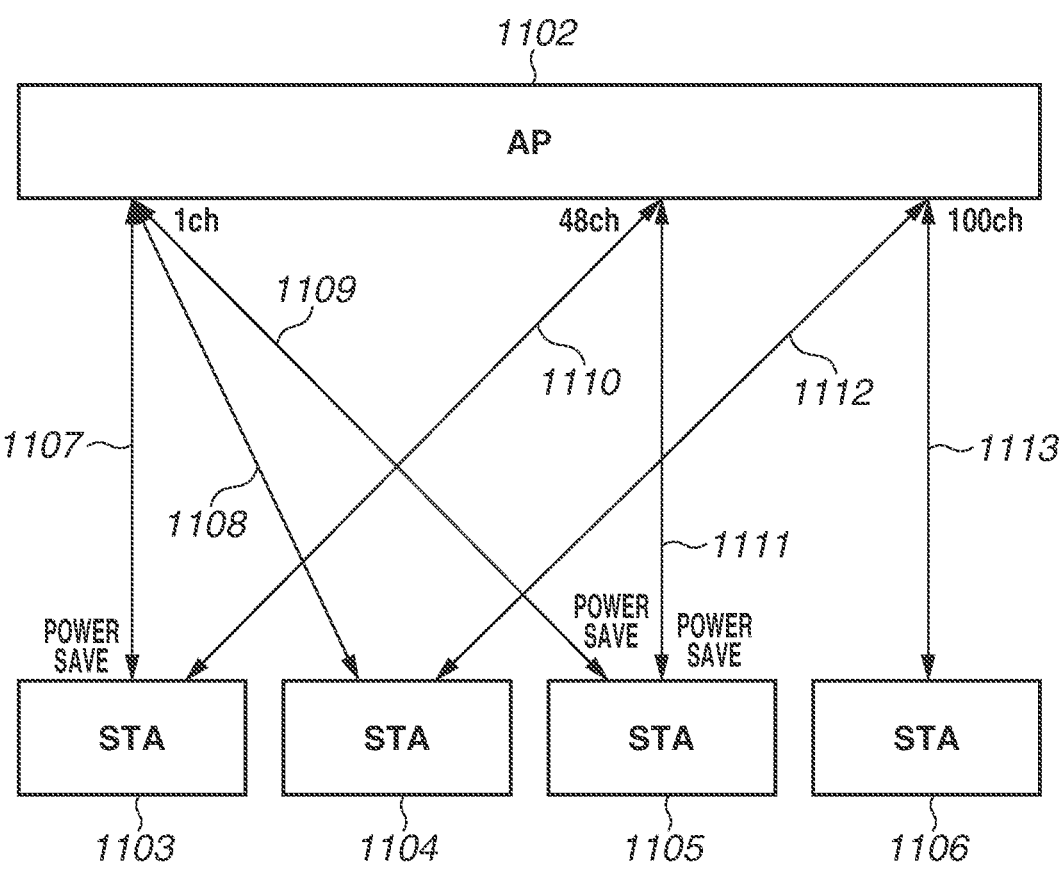
FIG. 11 is a diagram illustrating an example of a frequency channel configuration of a network which a communication apparatus establishes according to a fourth example embodiment.

FIG. 11 illustrates a frequency channel configuration example of a network which a communication apparatus 1102 establishes.

Communication apparatuses 1102 to 1106 establish links via a plurality of frequency channels and then perform multi-link communication. Here, the frequency channel is a frequency channel defined by the IEEE 802.11 series standard and refers to a frequency channel available for performing wireless communication compliant with the IEEE 802.11 series standard. Furthermore, if bonding with an adjacent frequency channel is performed, a bandwidth of 40

MHz or more can be used for one frequency channel Furthermore, the communication apparatus 1102 has configurations illustrated in FIG. 4 and FIG. 5 as with the above-mentioned communication apparatus 102.

Referring to FIG. 11, the communication apparatus 1102 and the communication apparatus 1103 have established connection via a frequency channel 1*ch* (1107) and a frequency channel 48*ch* (1110). Moreover, the communication apparatus 1103 on the frequency channel 1*ch* (1107) is in the power-saving state, and the communication apparatus 1103 on the frequency channel 48*ch* (1110) is not in the power-saving state. The communication apparatus 1102 and the communication apparatus 1104 have established connection via a frequency channel 1*ch* (1108) and a frequency channel 100*ch* (1112). Moreover, the communication apparatus 1104 on the frequency channel 1*ch* (1108) and the communication apparatus 1104 on the frequency channel 100*ch* (1112) are not in the power-saving state. The communication apparatus 1102 and the communication apparatus 1105 have established connection via a frequency channel 1*ch* (1109) and a frequency channel 48*ch* (1111). Moreover, the communication apparatus 1105 on the frequency channel 1*ch* (1109) and the communication apparatus 1105 on the frequency channel 48*ch* (1111) are in the power-saving state. The communication apparatus 1102 and the communication apparatus 1106 have established connection via a frequency channel 100*ch* (1113). Moreover, the communication apparatus 1106 on the frequency channel 100*ch* (1113) is not in the power-saving state.

In this way, the communication apparatus 1102 has established links using a plurality of frequency channels with the communication apparatuses 1103 to 1106 and is, therefore, able to increase a throughput in communications with the communication apparatuses 1103 to 1106. Moreover, since the communication apparatus 1102 has established a plurality of connections different in frequency band with the communication apparatuses 1103 to 1106, for example, even in a case where a frequency band is congested, the communication apparatus 1102 is able to communicate with the communication apparatuses 1103 to 1106 via the other frequency bands. Therefore, the communication apparatus 1102 is able to prevent a decrease in throughput in communications with the communication apparatuses 1103 to 1106.

An STA which is in the power-saving state transitions to a state of being able to perform communication by the STA returning from the power-saving state or by the AP causing the STA to return from the power-saving state.

Moreover, an STA notifies the AP that the STA has returned from the power-saving state, by, for example, transmitting, to the AP, a data frame in which "0" is stored in the power management subframe of the frame control field of the MAC header. Moreover, the AP causes an STA to return from the power-saving state, by, for example, transmitting, to the STA, a beacon frame in which "1" is stored in the bitmap control field of the traffic indication map (TIM) element.

Figure 12:
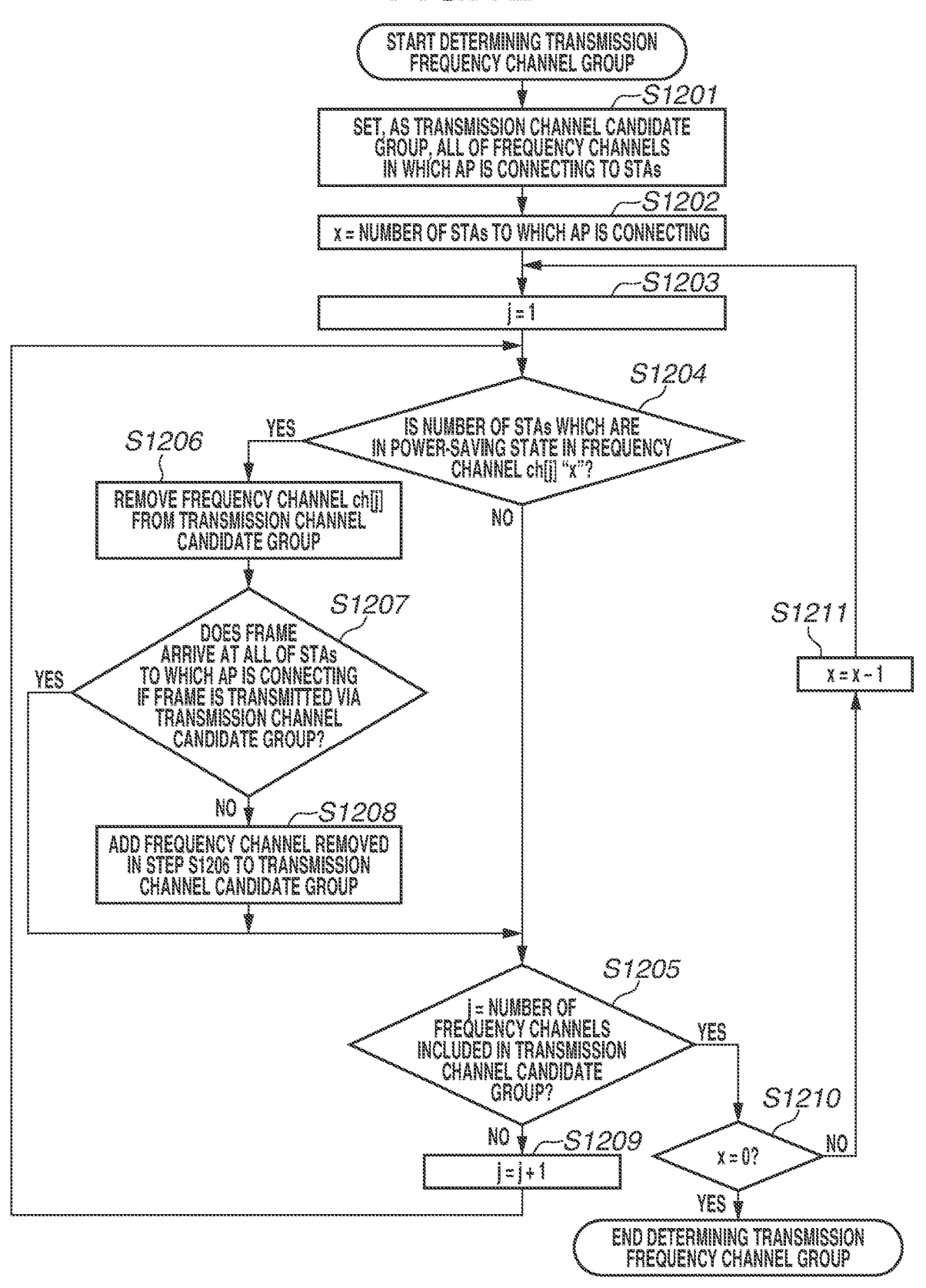
FIG. 12 is a flowchart of processing for determining a transmission frequency channel for use in transmitting a frame according to the fourth example embodiment.

FIG. 12 is a flowchart illustrating the flow of processing which is performed by the control unit 402 executing a program stored in the storage unit 401 of the communication apparatus 1102. In the fourth example embodiment, an example in which, while an AP prevents or reduces transmitting a frame via a frequency channel in which an STA operates in the power saving state, the AP determines a frequency channel for use in transmitting a frame while reducing the number of frequency channels for use in transmitting the frame is described. Here, the frequency channel in which an STA operates in the power saving state refers to a frequency channel via which transmission and transmission of a frame are not able to be performed.

The present flowchart is started by the communication apparatus 1102 transmitting a group addressed frame. Alternatively, the present flowchart can be started when a connection configuration between the communication apparatus 1102 and another communication apparatus has changed. When the connection configuration has changed refers to, for example, when a connection with another communication apparatus has been started in a new link, when a connection with another communication apparatus has been removed, or when the power-saving state in a frequency channel which is in the process of connection has changed.

First, in step S1201, the communication apparatus 1102 sets, as a transmission channel candidate group, all of the frequency channels in which the communication apparatus 1102 has established connection with STAs. In the fourth example embodiment, according to the frequency channel configuration example illustrated in FIG. 11, the frequency channels 1*ch*, 48*ch*, and 100*ch* are set as a transmission channel candidate group.

Next, in step S1202, the communication apparatus 1102 sets the number of STAs with which the communication apparatus 1102 has established connection as "x". In the fourth example embodiment, according to the frequency channel configuration example illustrated in FIG. 11, since there are four communication apparatuses 1103 to 1106, "4" is assigned to "x". The communication apparatus 1102 can acquire the number of STAs with which the communication apparatus 1102 has established connection, by counting the number of MLD MAC addresses with which connection has been established. Moreover, a communication apparatus capable of performing multi-link communication stores, in a management frame, a multi-link capability element, which is capability information regarding multi-link communication, and transmits the management frame. STA MAC addresses the number of which corresponds to the number of STAs with which connection has been established in each link are included in an STA Info field of the multi-link capability element.

For example, since the communication apparatus 1103 performs communication by two links, two STA MAC addresses are included. Supposing that a case where a plurality of STA MAC addresses is included in the above-mentioned way also indicates the same apparatus, the communication apparatus 1102 can acquire the number of STAs by counting the number of MAC addresses of STAs with which connection has been established in each frequency channel.

Next, in step 51203, the communication apparatus 1102 assigns "1" to "j", and, in step S1204, the communication apparatus 1102 determines whether the total number of STAs which are in the power-saving state on the frequency channel ch[j] from among the STAs with which connection has been established is "x". If, in step S1204, it is determined that the total number is "x" (YES in step S1204), the communication apparatus 1102 advances the processing to step S1206, and, if it is determined that the total number is not "x" (NO in step S1204), the communication apparatus 1102 advances the processing to step S1205. Here, ch[j] denotes a frequency channel which is included in the transmission channel candidate group and is the j-th frequency channel in ascending order of the channel number. For example, in a case where the transmission channel candidate group includes the frequency channels 1*ch*, 48*ch*, and 100*ch*, ch[1] denotes 1*ch*, ch[2] denotes 48*ch*, and ch[3] denotes 100*ch*. In the fourth example embodiment, since "j"

is equal to "1", according to the frequency channel configuration example illustrated in FIG. 11, the number of STAs which are in the power-saving state in the frequency channel ch[1], i.e., the frequency channel 1*ch*, is 2 and thus does not coincide with x=4, so that the communication apparatus 1102 advances the processing to step S1205.

Next, in step S1205, the communication apparatus 1102 determines whether "j" is the number of frequency channels included in the transmission channel candidate group. If it is determined that "j" is the number of frequency channels included in the transmission channel candidate group (YES in step S1205), the communication apparatus 1102 advances the processing to step S1210. If it is determined that "j" is not the number of frequency channels included in the transmission channel candidate group (NO in step S1205), the communication apparatus 1102 advances the processing to step S1209. In the fourth example embodiment, since "j" is equal to "1" and the transmission channel candidate group includes three frequency channels 1*ch*, 48*ch*, and 100*ch*, in step S1209, the communication apparatus 1102 assigns "j+1" to "j".

While the flow proceeds in this way, even when "j" is equal to "2" or "j" is equal to "3", according to the frequency channel configuration example illustrated in FIG. 11, the total number of STAs which are in the power-saving state is 2 at most and thus does not coincide with x=4, so that the result of determination in step S1204 is NO and the communication apparatus 1102 advances the processing to step S1205. Suppose that, when "j" is equal to "3", the communication apparatus 1102 has advanced the processing to step S1205.

When "j" is equal to "3", in step 51205, the communication apparatus 1102 determines whether "j" is the number of frequency channels included in the transmission channel candidate group. Since, currently, "j" is equal to "3" and the number of frequency channels included in the transmission channel candidate group is 3, the communication apparatus 1102 advances the processing to step S1210.

Next, in step S1210, the communication apparatus 1102 determines whether "x" coincides with "0". If, in step S1210, it is determined that "x" coincides with "0" (YES in step S1210), the communication apparatus 1102 ends processing in the present flowchart. The communication apparatus 1102 transmits a frame to the transmission channel candidate group determined at this time. If, in step S1210, it is determined that "x" does not coincide with "0" (NO in step S1210), the communication apparatus 1102 advances the processing to step S1211. Since, currently, "x" is equal to "4" and, therefore, does not coincide with "0", the communication apparatus 1102 advances the processing to step S1211, in which the communication apparatus 1102 assigns "x−1" to "x". Since, currently, "x" is 4, the communication apparatus 1102 sets "x=3" and then advances the processing to step S1203.

Next, in step S1203, the communication apparatus 1102 assigns "1" to "j" and then advances the processing to step S1204 and subsequent steps again. However, according to the frequency channel configuration example illustrated in FIG. 11, since the number of STAs which are in the power-saving state is 2 at most and thus does not coincide with x=3, so that the result of determination in step S1204 is NO and the communication apparatus 1102 advances the processing to step S1211 as a result.

Next, in step S1211, the communication apparatus 1102 sets "x=2", and then in step S1203, the communication apparatus 1102 assigns "1" to "j" and then advances the processing to step S1204.

In step S1204, the communication apparatus 1102 determines whether the total number of STAs which are in the power-saving state on the frequency channel ch[j] from among the STAs with which connection has been established is "x". In the fourth example embodiment, since, currently, "j" is equal to "1", according to the frequency channel configuration example illustrated in FIG. 11, the number of STAs which are in the power-saving state in the frequency channel ch[1], i.e., the frequency channel 1*ch*, is 2. Since, currently, "x" is equal to "2", the total number of STAs coincides with "x", so that the communication apparatus 1102 advances the processing to step S1206.

In step S1206, the communication apparatus 1102 removes the frequency channel ch[j] from the transmission channel candidate group.

Here, the frequency channel ch[1], i.e., the frequency channel 1*ch*, is removed from the transmission channel candidate group.

Next, in step S1207, the communication apparatus 1102 determines whether a frame arrives at all of the STAs with which connection has been established if the frame is transmitted to all of the frequency channels included in the transmission channel candidate group. Details of processing in step S1207 are described below with reference to FIG. 13.

If, in step S1207, it is determined that a frame arrives at all of the STAs (YES in step S1207), the communication apparatus 1102 advances the processing to step S1205, and, if it is determined that a frame does not arrive at all of the STAs (NO in step S1207), the communication apparatus 1102 advances the processing to step S1208. According to the frequency channel configuration example illustrated in FIG. 11, since, in step S1206, the communication apparatus 1102 has removed the frequency channel 1*ch* from the transmission channel candidate group, the transmission channel candidate group is composed of the frequency channel 48*ch* and the frequency channel 100*ch*. Assuming that transmission is performed to the frequency channel 48*ch*, a frame arrives at the communication apparatuses 1103 and 1105, and, assuming that transmission is performed to the frequency channel 100*ch*, a frame arrives at the communication apparatuses 1104 and 1106. Accordingly, since, if a frame is transmitted to all of the frequency channels included in the transmission channel candidate group, the frame arrives at all of the STAs with which connection has been established, the communication apparatus 1102 advances the processing to step S1205. In this way, the communication apparatus 1102 excludes, from the transmission channel candidate group, a frequency channel on which the number of STAs which are in the power-saving state is largest and in which, if a frame is transmitted, the frame arrives at all of the STAs. The above-described processing enables preventing or reducing wasteful frame transmission or wasteful processing for causing an STA which is in the power-saving state to transition to an awake state.

While the flow proceeds in this way, since the number of STAs which are in the power-saving state even in the frequency channel 48*ch* or the frequency channel 100*ch* does not exceed 1, in the case of x=2, the result of determination in step S1204 becomes NO. Suppose that, when "j" is equal to "2", the communication apparatus 1102 has advanced the processing to step S1205.

Since "j=2" coincides with the number of frequency channels included in the current transmission channel candidate group (48*ch* and 100*ch*), the communication apparatus 1102 advances the processing to step S1210, and, in step S1210, the communication apparatus 1102 determines whether "x" coincides with "0". Since, currently, "x" is equal to "2", the communication apparatus 1102 determines that "x" does not coincide with "0" and then advances the processing to step S1211. In step S1211, the communication apparatus 1102 sets "x =1" and then advances the processing to step S1203, and, in step S1203, the communication apparatus 1102 sets "j=1" and then advances the processing to step S1204.

In step S1204, the communication apparatus 1102 determines whether the total number of STAs which are in the power-saving state on the frequency channel ch[j] from among the STAs with which connection has been established is "x". Currently, the transmission channel candidate group is composed of the frequency channels 48ch and 100ch, so that the frequency channel ch[1] is the frequency channel 48ch and the frequency channel ch[2] is the frequency channel 100ch. According to the frequency channel configuration example illustrated in FIG. 11, since the number of STAs which are in the power-saving state in the frequency channel ch[1], i.e., the frequency channel 48ch, is 1 and thus coincides with "x=1", the communication apparatus 1102 advances the processing to step S1206.

In step S1206, the communication apparatus 1102 removes the frequency channel ch[j] from the transmission channel candidate group.

Here, the frequency channel ch[1], i.e., the frequency channel 48ch, is removed from the transmission channel candidate group.

Next, in step S1207, the communication apparatus 1102 determines whether a frame arrives at all of the STAs with which connection has been established if the frame is transmitted to all of the frequency channels included in the transmission channel candidate group. Details of processing in step S1207 are described below with reference to FIG. 13. According to the frequency channel configuration example illustrated in FIG. 11, the transmission channel candidate group is composed of only the frequency channel 100ch, and, assuming that transmission is performed to the frequency channel 100ch, a frame arrives at the communication apparatuses 1104 and 1106. Accordingly, since, if a frame is transmitted to all of the frequency channels included in the transmission channel candidate group, the frame does not arrive at all of the STAs with which connection has been established, the communication apparatus 1102 advances the processing to step S1208.

Since, in step S1207, it is determined that a frame does not arrive at all of the STAs, then in step S1208, the communication apparatus 1102 adds the frequency channel removed in step S1206 to the transmission channel candidate group. Here, the frequency channel 48ch is added to the transmission channel candidate group, so that the transmission channel candidate group becomes composed of the frequency channels 48ch and 100ch.

While the flow proceeds in this way, in step S1204, the communication apparatus 1102 extracts a frequency channel in which "x" is equal to "0", i.e., any STA which is in the power-saving state does not exist, and, if there is a frequency channel in which any STA which is in the power-saving state does not exist, the communication apparatus 1102 determines whether being able to omit frame transmission in the frequency channel.

Next, in step S1210, the communication apparatus 1102 determines whether "x" coincides with "0". Since, currently, "x" is equal to "0" and, therefore, coincides with "0", the communication apparatus 1102 ends processing in the present flowchart.

With the above-described processing performed, in the fourth example embodiment, the frequency channels 48ch and 100ch are determined as the transmission channel candidate group, so that the communication apparatus 1102 transmits a frame to the determined frequency channels. Moreover, since the communication apparatus 1102 does not transmit a frame to a frequency channel which has not been determined, in the fourth example embodiment, the communication apparatus 1102 does not transmit a frame to the frequency channel 1ch.

Figure 13:
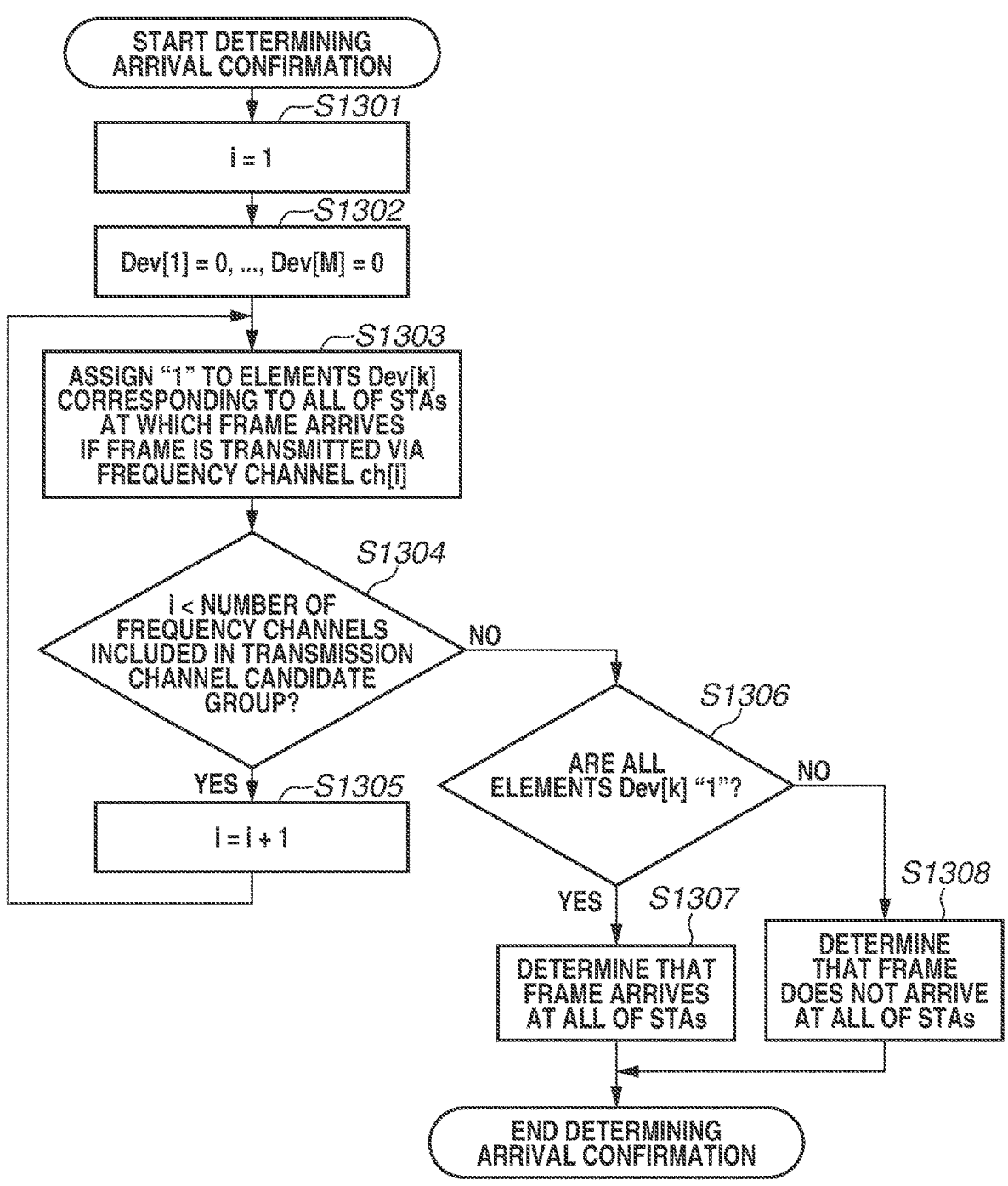
FIG. 13 is a flowchart of processing for determining a transmission frequency channel for use in transmitting a frame according to the fourth example embodiment.

FIG. 13 is a flowchart illustrating the flow of processing which is performed by the control unit 402 executing a program stored in the storage unit 401 of the communication apparatus 1102. In the fourth example embodiment, an example in which an AP determines whether a frame arrives at all of the STAs which are connecting to the AP if the frame is transmitted to the transmission channel candidate group is described. The flowchart of FIG. 13 corresponds to processing in step S1207 illustrated in FIG. 12 and processing in step S1405 illustrated in FIG. 14.

The present flowchart is started when processing in step S1207 illustrated in FIG. 12 is performed.

First, in step S1301, the communication apparatus 1102 assigns "1" to "i".

Next, in step S1302, with regard to an array Dev of elements the number of which is M, the communication apparatus 1102 assigns "0" to the respective elements Dev [1], Dev[2], . . . , Dev[M]. Here, M is the number of STAs which have established connection with the communication apparatus 1102. According to the frequency channel configuration example illustrated in FIG. 11, since the communication apparatus 1102 is connecting to the communication apparatuses 1103 to 1106, M is equal to "4". Moreover, the respective elements Dev[k] are associated with the STAs which have established connection. For example, the element Dev[1] is associated with the communication apparatus 1103, the element Dev [2] is associated with the communication apparatus 1104, the element Dev[3] is associated with the communication apparatus 1105, and the element Dev[4] is associated with the communication apparatus 1106. The above-mentioned association can be performed in such a manner that the elements starting with Dev[1] are associated in order with STAs arranged in alphabetical order of MAC address, are associated with STAs in the order in which association has been performed, or are associated with STAs in no particular order and in a random manner Next, in step S1303, the communication apparatus 1102 assigns "1" to elements Dev[k] corresponding to all of the STAs at which a frame arrives if the frame is transmitted via a frequency channel ch[i]. For example, in a case where the transmission channel candidate group is composed of the frequency channels 48ch and 100ch, according to the frequency channel configuration example illustrated in FIG. 11, the frequency channel ch[1] means the frequency channel 48ch. Since a frame transmitted in the frequency channel 48ch arrives at the communication apparatus 1103 and the communication apparatus 1105, the communication apparatus 1102 assigns "1" to the associated elements Dev[1] and Dev[3].

Next, in step S1304, the communication apparatus 1102 determines whether "i" is smaller than the number of frequency channels included in the transmission channel candidate group. If, in step S1304, it is determined that "i" is smaller than the number of frequency channels included in the transmission channel candidate group (YES in step S1304), the communication apparatus 1102 advances the processing to step S1305. If, in step S1304, it is determined that "i" is not smaller than the number of frequency channels included in the transmission channel candidate group (NO in step S1304), the communication apparatus 1102 advances the processing to step S1306. In the fourth example embodiment, currently, "i" is equal to "1", and, in a case where the transmission channel candidate group is composed of the frequency channels 48*ch* and 100*ch*, the number of frequency channels is 2, so that the communication apparatus 1102 advances the processing to step S1305.

If, in step S1304, it is determined that "i" is smaller than the number of frequency channels included in the transmission channel candidate group, then in step S1305, the communication apparatus 1102 assigns "i+1" to "i".

Next, in step S1303, the communication apparatus 1102 assigns "1" to elements Dev[k] corresponding to all of the STAs at which a frame arrives if the frame is transmitted via a frequency channel ch[i]. For example, in a case where the transmission channel candidate group is composed of the frequency channels 48*ch* and 100*ch*, "i" is equal to "2" and, according to the frequency channel configuration example illustrated in FIG. 11, the frequency channel ch[2] means the frequency channel 100*ch*. Since, in a case where a frame is transmitted in the frequency channel 100*ch*, the frame arrives at the communication apparatus 1104 and the communication apparatus 1106, the communication apparatus 1102 assigns "1" to the associated elements Dev[2] and Dev[4].

Next, in step S1304, the communication apparatus 1102 determines whether "i" is smaller than the number of frequency channels included in the transmission channel candidate group. Since "i" is equal to "2" and, in a case where the transmission channel candidate group is composed of the frequency channel 48*ch* and the frequency channel 100*ch*, the number of frequency channels is 2 (NO in step S1304), the communication apparatus 1102 advances the processing to step S1306.

Next, in step S1306, the communication apparatus 1102 determines whether all of the elements of the array Dev are "1". If, in step S1306, it is determined that there is at least one element of the array Dev which is not "1" (NO in step S1306), the communication apparatus 1102 advances the processing to step S1308. If, in step S1306, it is determined that all of the elements of the array Dev are "1" (YES in step S1306), the communication apparatus 1102 advances the processing to step S1307. In the fourth example embodiment, since all of the elements Dev[1], Dev[2], Dev[3], and Dev[4] are made to be "1" by the processing in step S1303, the communication apparatus 1102 advances the processing to step S1307, in which the communication apparatus 1102 determines that a frame arrives at all of the STAs with which connection has been established and then ends processing in the present flowchart.

On the other hand, in step S1308, the communication apparatus 1102 determines that a frame does not arrive at all of the STAs if the frame is transmitted to the transmission channel candidate group, and then ends processing in the present flowchart.

According to the fourth example embodiment, the communication apparatus 1102 examines whether being able to preferentially omit transmission in a frequency channel starting with a frequency channel on which the number of STAs which are in the power-saving state is largest. In a case where transmission in a frequency channel is able to be omitted, omitting transmission of a frame in the frequency channel enables preventing or reducing wasteful frame transmission or wasteful processing for causing an STA which is in the power-saving state to transition to an awake state.

In the fourth example embodiment, an example in which, with respect to frequency channels in which an AP and an STA have established connection, the AP examines whether being able to preferentially omit transmission in a frequency channel starting with a frequency channel on which the number of STAs which are in the power-saving state is largest has been described. In a fifth example embodiment, an example in which, with respect to frequency channels in which an AP and an STA have established connection, the AP examines all of the transmission patterns and determines a frequency channel for use in transmitting a frame while preventing or reducing transmission of a frame to a frequency channel in which the STA operates in the power-saving state is described.

Figure 14:
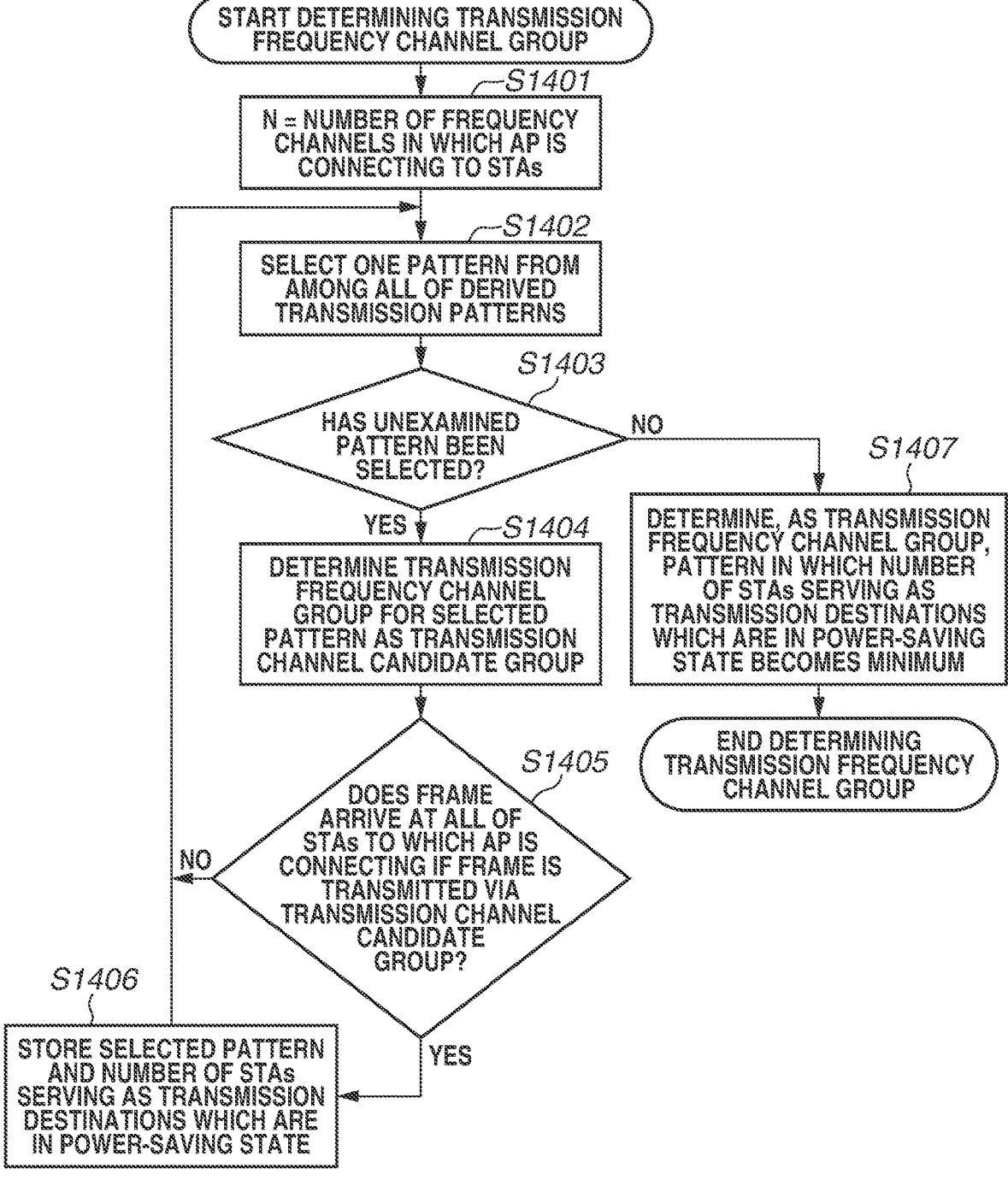
FIG. 14 is a flowchart of processing for determining a transmission frequency channel for use in transmitting a frame according to a fifth example embodiment.

FIG. 14 is a flowchart illustrating the flow of processing which is performed by the control unit 402 executing a program stored in the storage unit 401 of the communication apparatus 1102. In the fifth example embodiment, an example in which an AP determines a frequency channel for use in transmitting a frame in such a way as to minimize the number of STAs which are in the power-saving state to which to transmit the frame is described.

The present flowchart is started by the communication apparatus 1102 transmitting a group addressed frame. Alternatively, the present flowchart can be started when a connection configuration between the communication apparatus 1102 and another communication apparatus has changed. When the connection configuration has changed refers to, for example, when a connection with another communication apparatus has been started in a new link, when a connection with another communication apparatus has been removed, or when the power-saving state in a frequency channel which is in the process of connection has changed.

First, in step S1401, the communication apparatus 1102 assigns the number of frequency channels in which the communication apparatus 1102 have established connection with an STA to "N". According to the frequency channel configuration example illustrated in FIG. 11, the number of frequency channels is three, i.e., the frequency channels 1*ch*, 48*ch*, and 100*ch*.

Next, in step S1402, the communication apparatus 1102 derives all of the transmission patterns with respect to all of the frequency channels in which connection has been established, and selects one new pattern from the derived frequency channels. With regard to patterns for transmitting a frame, the communication apparatus 1102 derives patterns the number of which corresponds to "(the N-th power of 2)−1".

According to the frequency channel configuration example illustrated in FIG. 11, since the frequency channels in which connection has been established are the frequency channels 1*ch*, 48*ch*, and 100*ch*, there are considered seven patterns. The first pattern is a pattern in which a frame is transmitted in the frequency channels 1*ch*, 48*ch*, and 100*ch*, and the second pattern is a pattern in which a frame is transmitted in the frequency channels 1*ch* and 48*ch* and a frame is not transmitted in the frequency channel 100*ch*. The third pattern is a pattern in which a frame is transmitted in the frequency channel 1*ch*, a frame is not transmitted in the frequency channel 48*ch*, and a frame is transmitted in the frequency channel 100*ch*, and the fourth pattern is a pattern in which a frame is transmitted in the frequency channel 1*ch*, a frame is not transmitted in the frequency channel 48*ch*, and a frame is not transmitted in the frequency channel 100*ch*.

The fifth pattern is a pattern in which a frame is not transmitted in the frequency channel 1*ch* and a frame is transmitted in the frequency channels 48*ch* and 100*ch*, and the sixth pattern is a pattern in which a frame is not transmitted in the frequency channel 1*ch*, a frame is transmitted in the frequency channel 48*ch*, and a frame is not transmitted in the frequency channel 100*ch*. The seventh pattern is a pattern in which a frame is not transmitted in the frequency channels 1*ch* and 48*ch* and a frame is transmitted in the frequency channel 100*ch*. Furthermore, with regard to a pattern in which a frame is transmitted in none of the frequency channels, since it is apparent that a frame arrives at none of the STAs, it is not necessary to consider such a pattern. In the fifth example embodiment, first, the above-mentioned first pattern is supposed to have been selected.

Next, in step S1403, the communication apparatus 1102 determines whether the pattern selected in step S1402 is an unexamined pattern. If it is determined that the pattern selected in step S1402 is an unexamined pattern (YES in step S1403), the communication apparatus 1102 advances the processing to step S1404. If, in step S1403, it is determined that there is no unexamined pattern (NO in step S1403), the communication apparatus 1102 advances the processing to step S1407.

If, in step S1403, it is determined that an unexamined pattern has been selected, then in step S1404, the communication apparatus 1102 determines a transmission frequency channel group for the selected pattern as the transmission channel candidate group. In the fifth example embodiment, since, first, the first pattern has been selected, the transmission channel candidate group is composed of the frequency channels 1*ch*, 48*ch*, and 100*ch*.

In step S1405, the communication apparatus 1102 determines whether a frame arrives at all of the STAs with which connection has been established if the frame is transmitted to all of the frequency channels included in the transmission channel candidate group selected in step S1404. Details of processing in step S1405 are similar to those described with reference to FIG. 13.

If, in step S1405, it is determined that a frame arrives at all of the STAs (YES in step S1405), the communication apparatus 1102 advances the processing to step S1406. If, in step S1405, it is determined that a frame does not arrive at all of the STAs (NO in step S1405), the communication apparatus 1102 advances the processing to step S1402. In the fifth example embodiment, since, if a frame is transmitted in the frequency channels 1*ch*, 48*ch*, and 100*ch* with use of the first pattern, the frame arrives at all of the communication apparatuses 1103 to 1106, the communication apparatus 1102 advances the processing to step S1406.

Next, in step S1406, the communication apparatus 1102 stores, in the storage unit 401, the pattern selected in step S1402 and the number of STAs serving as transmission destinations which are in the power-saving state at that time. In the case of the first pattern, according to the frequency channel configuration example illustrated in FIG. 11, since the number of STAs which are in the power-saving state is 2, the communication apparatus 1102 stores "2" as the number of STAs serving as transmission destinations which are in the power-saving state.

While the flow proceeds in this way and the number of patterns selected in step S1402 gradually increases, if, in step S1403, it is determined that all of the patterns, i.e., the above-mentioned first pattern to seventh pattern, have been examined, the communication apparatus 1102 advances the processing to step S1407.

In step S1407, the communication apparatus 1102 selects, as a transmission frequency channel group, a pattern in which the number of STAs serving as transmission destinations which are in the power-saving state becomes minimum from among the patterns stored in step S1406. Furthermore, in a case where there is a plurality of patterns in which the number of STAs serving as transmission destinations which are in the power-saving state, stored in step S1406, is minimum, the communication apparatus 1102 selects, as a transmission frequency channel, a pattern in which the number of frequency channels for use in transmitting a frame is smaller, and then ends processing in the present flowchart.

In the fifth example embodiment, the communication apparatus 1102 prevents or reduces transmitting a frame to a frequency channel in which an STA operates in the power-saving state and determines a frequency channel for use in transmitting a frame while reducing the number of frequency channels for use in transmitting the frame. Performing the above-described processing enables preventing or reducing wasteful frame transmission or wasteful processing for causing an STA which is in the power-saving state to transition to an awake state.

Furthermore, while, in the fifth example embodiment, an example in which an AP prevents or reduces transmitting a frame to a frequency channel in which an STA operates in the power-saving state and determines a frequency channel for use in transmitting a frame while reducing the number of frequency channels for use in transmitting the frame has been described, the fifth example embodiment is not limited to this. The fifth example embodiment can also be applied to a case where an AP prevents or reduces transmitting a frame to a frequency channel which is high in congestion degree as in the second example embodiment.

While, in the above-described example embodiments, an example in which a communication apparatus having the hardware configuration illustrated in FIG. 4 performs processing illustrated in the flowcharts of FIG. 7 to FIG. 10 and FIG. 12 to FIG. 14 has been described, a wireless chip including the storage unit, the control unit, and the communication unit illustrated in FIG. 4 can be configured to perform processing in the above-mentioned flowcharts. Thus, a communication apparatus according to each example embodiment can be a wireless chip including the storage unit, the control unit, and the communication unit illustrated in FIG. 4.

Furthermore, a configuration which provides a storage medium storing program code of software for implementing the above-described functions to a system or apparatus and causes a computer (central processing unit (CPU) or micro processing unit (MPU)) of the system or apparatus to read out and execute the program code stored in the storage medium can be employed. In this case, the program code itself read out of the storage medium implements the functions of the above-described example embodiments and the storage medium storing the program code configures the above-described apparatus.

The storage medium to be used for providing program code includes, for example, a flexible disk, a hard disk, an optical disc, a magnetooptical disc, a compact disc-read-only memory (CD-ROM), a CD recordable (CD-R), a magnetic tape, a non-volatile memory card, a ROM, and a digital versatile disc (DVD).

Moreover, not only a configuration which executes program code read out by a computer to implement the above-described functions is employed but also an OS running on the computer can perform some or all of the actual processing operations based on instructions of the program code to implement the above-described functions. OS is an abbreviation for operating system.

Additionally, the program code read out of the storage medium can be written to a memory included in a function expansion card inserted into the computer or a function expansion unit connected to the computer.

Then, a CPU included in the function expansion card or the function expansion unit can perform some or all of the actual processing operations based on instructions of the program code to implement the above-described functions.

Various embodiments of the present disclosure can also be implemented by performing processing for providing a program for implementing one or more functions of the above-described example embodiments to a system or apparatus via a network or storage medium and causing one or more processors included in a computer of the system or apparatus to read out and execute the program. Moreover, various embodiments the present disclosure can also be implemented by a circuit which implements one or more functions of the above-described example embodiments (for example, an application specific integrated circuit (ASIC)).

According to various embodiments of the present disclosure, when a communication apparatus and another communication apparatus have established connection via a plurality of frequency channels, it is possible to prevent or reduce transmission of a frame via all of the frequency channels in which connection has been established.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)TM), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Applications No. 2021-053214, filed Mar. 26, 2021, and No. 2021-209577, filed Dec. 23, 2021, which are hereby incorporated by reference herein in their entirety.

What is claimed is:

1. A communication apparatus comprising:
at least one memory that stores a set of instructions; and
at least one processor that executes the instructions, the instructions, when executed, causing the communication apparatus to perform operations comprising:
communicating an Association frame including a Muli-Link Element with another communication apparatus via a first frequency channel;
wherein the communication apparatus establishes, based on the Association frame communicated via the first frequency channel, connection with said another communication apparatus via the first frequency channel, a second frequency channel, and a third frequency channel; and
wherein a first link is a link via the first frequency channel, a second link is a link via the second frequency channel, and a third link is a link via the third frequency channel,
transmitting a frame by multicast communication or broadcast communication;
wherein, in a case where the second link and the third link are a pair of non-simultaneous transmit and receive (non-STR) links, the frame is transmitted via the first link, and the frame is not transmitted via either the second link or the third link.

2. The communication apparatus according to claim 1, wherein the frame is a group addressed frame.

3. The communication apparatus according to claim 2, wherein the group addressed frame is a management frame.

4. The communication apparatus according to claim 1, wherein the communication apparatus performs a communication compliant with IEEE 802.11 series standard.

5. The communication apparatus according to claim 1, wherein, for the second link and the third link which are the pair of non-STR links, data cannot be received via the third link while data is being transmitted via the second link.

6. The communication apparatus according to claim 1, wherein the first link has a simultaneous transmit and receive (STR) relationship with the second link and the third link.

7. The communication apparatus according to claim 1, wherein, in a case where the second link and the third link are not a pair of non-simultaneous transmit and receive (non-STR) links, the instructions further cause the communication apparatus to select a link for transmitting the frame by a predetermined method,
wherein the predetermined method comprises at least one of: randomly selecting the link, selecting the link according to an order of channel numbers, or selecting the link based on a determination of which link is capable of transmitting the frame to the largest number of stations.

8. A communication method for a communication apparatus, the communication method comprising:
communicating an Association frame including a Muli-Link Element with another communication apparatus via a first frequency channel;
wherein the communication apparatus establishes, based on the Association frame communicated via the first frequency channel, connection with said another communication apparatus via the first frequency channel, a second frequency channel, and a third frequency channel; and wherein a first link is a link via the first frequency channel, a second link is a link via the second frequency channel, and a third link is a link via the third frequency channel, transmitting a frame by multicast communication or broadcast communication;

wherein, in a case where the second ling and the third link are a pair of non-simultaneous transmit and receive (non-STR) links, the frame is transmitted via the first link, and the frame is not transmitted via either the second link or the third link.

9. A non-transitory computer-readable storage medium storing computer-executable instructions that, when executed by a computer, cause the computer to perform a method for a communication apparatus, the method comprising:

communicating an Association frame including a Muli-Link Element with another communication apparatus via a first frequency channel, wherein the communication apparatus establishes, based on the Association frame communicated via the first frequency channel, establishing connection with said another communication apparatus via the first frequency channel, a second frequency channel, and a third frequency channel; and wherein a first link is a link via the first frequency channel, a second link is a link via the second frequency channel, and a third link is a link via the third frequency channel, transmitting a frame by multicast communication or broadcast communication, wherein, in a case where the second ling and the third link are a pair of non-simultaneous transmit and receive (non-STR) links, the frame is transmitted via the first link, and the frame is not transmitted via either the second link or the third link.

* * * * *